US012808161B2

(12) United States Patent
Akiyama et al.

(10) Patent No.: US 12,808,161 B2
(45) Date of Patent: Nov. 24, 2026

(54) TARGET PATH CHANGING SYSTEM FOR ATTACHMENT

(71) Applicant: KOBELCO CONSTRUCTION MACHINERY CO., LTD., Hiroshima (JP)

(72) Inventors: Masaki Akiyama, Hiroshima (JP); Daisuke Noda, Hiroshima (JP); Koji Yamashita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 847 days.

(21) Appl. No.: 18/041,907

(22) PCT Filed: Jul. 7, 2021

(86) PCT No.: PCT/JP2021/025698
§ 371 (c)(1),
(2) Date: Feb. 16, 2023

(87) PCT Pub. No.: WO2022/038915
PCT Pub. Date: Feb. 24, 2022

(65) Prior Publication Data

US 2024/0026658 A1 Jan. 25, 2024

(30) Foreign Application Priority Data

Aug. 19, 2020 (JP) ................................ 2020-138452
Oct. 13, 2020 (JP) ................................ 2020-172462

(51) Int. Cl.
*E02F 9/26* (2006.01)
*E02F 3/32* (2006.01)
(Continued)

(52) U.S. Cl.
CPC ................ *E02F 9/264* (2013.01); *E02F 9/24* (2013.01); *E02F 9/261* (2013.01);
(Continued)

(58) Field of Classification Search
CPC .. G05D 1/0212; G05D 1/0219; G05D 1/0246; G05D 1/648; G06F 3/04845;
(Continued)

(56) References Cited

U.S. PATENT DOCUMENTS 10,761,537 B1 * 9/2020 Ready-Campbell ......................... G05D 1/0212
2003/0036817 A1 * 2/2003 Morley .................. E02F 9/205 700/245

(Continued)

FOREIGN PATENT DOCUMENTS

JP 10-8490 A 1/1998
JP 2001-182091 A 7/2001

OTHER PUBLICATIONS

International Search Report mailed on Oct. 5, 2021 in PCT/JP2021/025698 filed on Jul. 7, 2021.

*Primary Examiner* — Nicholas Klicos
(74) *Attorney, Agent, or Firm* — Oblon, McClelland, Maier & Neustadt, L.L.P.

(57) ABSTRACT

A target path changing system for an attachment, which is capable of improving the working efficiency of an operation to change a target path of a specific part of the attachment, is provided. An object point selection unit is configured to allow an operator to select one of target points as a change object point. A range setting unit is configured to set a movable range in which the change object point is movable. An object point movement unit allows the operator to move the change object point within the movable range. A target path resetting unit is configured to reset a target path between a change start point and a change end point so that
(Continued)

the target path passes through an after-movement change object point.

18 Claims, 14 Drawing Sheets

(51) Int. Cl.

| | |
|---|---|
| ***E02F 9/24*** | (2006.01) |
| ***G06F 3/04845*** | (2022.01) |
| ***G06F 3/04847*** | (2022.01) |
| *E02F 3/43* | (2006.01) |
| *G06F 3/04842* | (2022.01) |
| *G06F 3/0488* | (2022.01) |

(52) U.S. Cl.
CPC ...... *G06F 3/04845* (2013.01); *G06F 3/04847* (2013.01); *E02F 3/32* (2013.01); *E02F 3/436* (2013.01); *G06F 3/04842* (2013.01); *G06F 3/0488* (2013.01)

(58) Field of Classification Search
CPC ............. G06F 3/04842; G06F 3/04847; G06F 3/0486; E02F 9/264; E02F 9/2045; E02F 9/265; E02F 9/262; E02F 3/32; E02F 3/436; E02F 3/437; E02F 3/439
See application file for complete search history.

(56) References Cited

U.S. PATENT DOCUMENTS

| | | | | |
|---|---|---|---|---|
| 2004/0158355 | A1* | 8/2004 | Holmqvist | G05D 1/0236 701/23 |
| 2004/0267404 | A1* | 12/2004 | Danko | E02F 3/438 700/245 |
| 2010/0076640 | A1* | 3/2010 | Maekawa | G05D 1/0217 701/25 |
| 2010/0249957 | A1* | 9/2010 | Price | G08C 17/02 700/83 |
| 2011/0106384 | A1* | 5/2011 | Corke | E02F 3/48 701/50 |
| 2016/0289928 | A1* | 10/2016 | Kitajima | E02F 3/32 |
| 2018/0182120 | A1* | 6/2018 | Izumikawa | G06T 7/593 |
| 2019/0009412 | A1* | 1/2019 | Khan | B25J 9/1697 |
| 2019/0369592 | A1* | 12/2019 | Oonishi | G06F 1/206 |
| 2020/0032490 | A1* | 1/2020 | Ready-Campbell | E02F 9/262 |
| 2020/0089222 | A1* | 3/2020 | Cámara Puerto | G05D 1/227 |
| 2020/0299929 | A1* | 9/2020 | Ohiwa | E02F 9/123 |
| 2021/0047808 | A1* | 2/2021 | Yamada | E02F 9/268 |
| 2021/0262820 | A1* | 8/2021 | Chhajer | G06F 3/1462 |
| 2021/0298846 | A1* | 9/2021 | Dozeman | A61B 34/32 |

* cited by examiner

TARGET PATH CHANGING SYSTEM FOR ATTACHMENT

TECHNICAL FIELD

The present invention relates to a target path changing system for an attachment, which is configured to change a target path of a specific part of an attachment of a working machine.

BACKGROUND ART

As disclosed in Patent Literature 1, there is a technology of causing an excavator to automatically perform a series of actions repeatedly, based on an excavating position and a soil releasing position that are taught in advance.

CITATION LIST

Patent Literatures

[Patent Literature 1] Japanese Laid-Open Patent Publication No. 2001-182091

SUMMARY OF INVENTION

Technical Problem

When a working machine is automatically driven, a specific part (e.g., the leading end of a bucket) of an attachment is repeatedly moved along a target path. Depending on, for example, the situation of the workplace, the target path may need to be partially changed. The working efficiency is low if it is necessary to set the entire target path again by, for example, performing the teaching again.

An object of the present invention is to provide a target path changing system for an attachment, which is capable of improving the working efficiency of an operation to change a target path of a specific part of the attachment.

Solution to Problem

A target path changing system for an attachment is used for a working machine including a lower running body, an upper turning body attached to an upper part of the lower running body to the rotatable, and the attachment attached to the upper turning body. The target path changing system for the attachment includes a target point setting unit, a display device, a object point selection unit, a range setting unit, a object point movement unit, and a target path resetting unit. The target point setting unit is configured to set target points at specific intervals on a target path of a specific part of the attachment. The display device is configured to display the target path and the target points. The object point selection unit is configured to allow an operator to select one of the target points as a change object point. The range setting unit is configured to set a movable range in which the change object point is movable. The object point movement unit is configured to allow the operator to move the change object point within the movable range. The target path resetting unit is configured to reset the target path between the change start point and the change end point so that an after-movement change object point that is the change object point after the movement passes through the target path. The change start point is a target point forward of the change object point. The change end point is a target point rearward of the change object point.

Advantageous Effects of Invention

The arrangement above makes it possible to improve the working efficiency of the operation of changing the target path of the specific part of the attachment.

DESCRIPTION OF EMBODIMENTS

The following will describe an embodiment of the present invention with reference to figures.

First Embodiment (Structure of Target Path Changing System 1)

Figure 1:
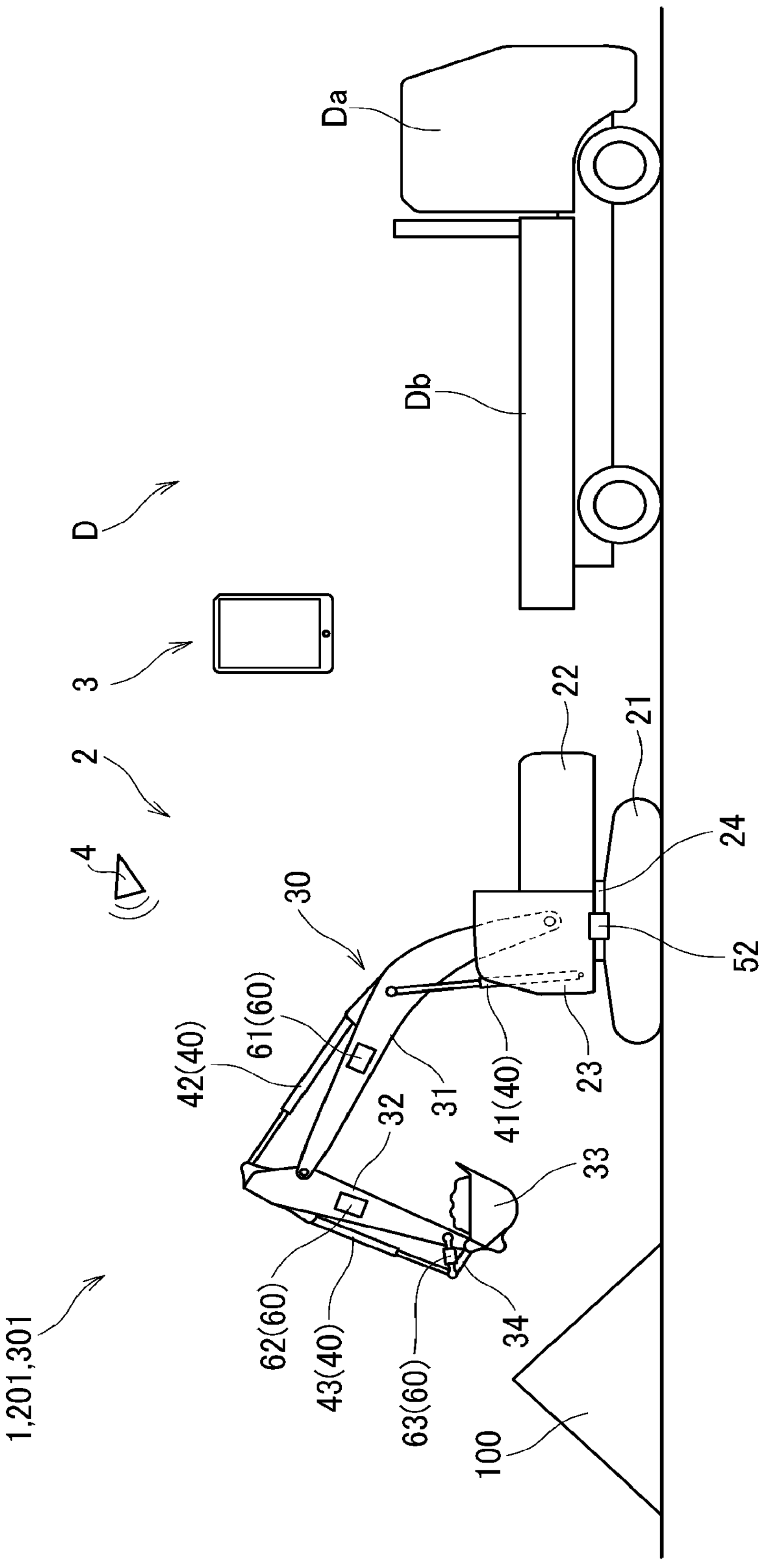
FIG. 1 shows a structure of a target path changing system.

A target path changing system 1 of an attachment 30 of First Embodiment of the present invention is configured to change a target path 71 (see FIG. 3) of a specific part of the attachment 30 of a working machine 2 shown in FIG. 1. The target path changing system 1 includes the working machine 2, a portable terminal 3, and a camera 4 (surrounding state acquisition device).

(Structure of Working Machine)

The working machine 2 is configured to perform operations by using the attachment 30. An example of the working machine 2 is a hydraulic excavator. The working machine 2 includes a lower running body 21, an upper turning body 22, a turning device 24, the attachment 30, a cylinder 40, an operation lever 51 (see FIG. 2), a turning angular sensor 52, and a tilt angle sensor 60.

The lower running body 21 is a part for running the working machine 2 and includes, for example, a crawler. The upper turning body 22 is rotatably attached to an upper part of the lower running body 21. The upper turning body 22 includes a cab 23 (driver's cabin) provided at a front part of the upper turning body 22. The turning device 24 is able to turn the upper turning body 22 relative to the lower running body 21.

The attachment 30 is attached to the upper turning body 22 to be rotatable in the up-down direction. The attachment 30 includes a boom 31, an arm 32, and a bucket 33 (leading-end attachment). The boom 31 is attached to the upper turning body 22 to be rotatable in the up-down direction. The arm 32 is attached to the boom 31 to be rotatable in the up-down direction. The bucket 33 is attached to the arm 32 to be rotatable in the up-down direction. The bucket 33 performs operations such as excavation, holding, throwing, smoothing, and scooping of an operation target (e.g., soil). The bucket 33 is only an example of the leading-end attachment attached to the arm 32. The leading-end attachment may be a nibbler or a clamp arm. The operation target of the bucket 33 may be, for example, soil, gravel, rubble, or scrap iron. The directions in which the leading end of the bucket 33 are movable are the front-rear direction of the upper turning body 22 and the up-down direction of the upper turning body 22. The attachment 30 extends and contracts in the front-rear direction of the upper turning body 22. The attachment 30 rotates in the up-down direction of the upper turning body 22.

The cylinder 40 is able to rotate the attachment 30 by hydraulic pressure. The cylinder 40 is a hydraulic telescopic cylinder. The cylinder 40 includes a boom cylinder 41, an arm cylinder 42, and a bucket cylinder 43 (leading-end attachment cylinder).

The boom cylinder 41 rotationally drives the boom 31 relative to the upper turning body 22. A base end portion of the boom cylinder 41 is rotatably attached to the upper turning body 22. A leading end portion of the boom cylinder 41 is rotatably attached to the boom 31.

The arm cylinder 42 rotationally drives the arm 32 relative to the boom 31. A base end portion of the arm cylinder 42 is rotatably attached to the boom 31. A leading end portion of the arm cylinder 42 is rotatably attached to the arm 32.

The bucket cylinder 43 (leading-end attachment cylinder) rotationally drives the bucket 33 relative to the arm 32. A base end portion of the bucket cylinder 43 is rotatably attached to the arm 32. A leading end portion of the bucket cylinder 43 is rotatably attached to a link component 34 which is rotatably attached to the bucket 33.

The operation lever 51 is operated by an operator to drive the turning device 24 and the attachment 30. The operation lever 51 is, for example, provided in the cab 23. When the working machine 2 is remotely controlled, the operation lever 51 is provided outside the working machine 2.

The turning angular sensor 52 is configured to detect a turning angle θ (see FIG. 12) of the upper turning body 22 relative to the lower running body 21. The turning angular sensor 52 is, for example, an encoder, a resolver, or a gyro sensor. In the present embodiment, the turning angle θ of the upper turning body 22 is 0 degree when the front of the upper turning body 22 coincides with the front of the lower running body 21.

The tilt angle sensor 60 is configured to detect the posture of the attachment 30. The tilt angle sensor 60 includes a boom tilt angle sensor 61, an arm tilt angle sensor 62, and a bucket tilt angle sensor 63.

The boom tilt angle sensor 61 is configured to detect the posture of the boom 31. For example, the boom tilt angle sensor 61 may be a sensor configured to obtain a tilt angle of the boom 31 relative to the horizontal line, e.g., a tilt (acceleration) sensor, to be specific. In this case, the boom tilt angle sensor 61 is attached to the boom 31. The boom tilt angle sensor 61 may be a rotational angle sensor configured to detect the rotational angle of a boom foot pin (boom base end) or a stroke sensor configured to detect a stroke amount of the boom cylinder 41.

The arm tilt angle sensor 62 is configured to detect the posture of the arm 32. For example, the arm tilt angle sensor 62 may be a sensor configured to obtain a tilt angle of the arm 32 relative to the horizontal line, e.g., a tilt (acceleration) sensor, to be specific. In this case, the arm tilt angle sensor 62 is attached to the arm 32. The arm tilt angle sensor 62 may be a rotational angle sensor configured to detect the rotational angle of an arm connection pin (arm base end) or a stroke sensor configured to detect a stroke amount of the arm cylinder 42.

The bucket tilt angle sensor 63 (leading-end attachment tilt angle sensor) is configured to detect the posture of the bucket 33. For example, the bucket tilt angle sensor 63 may be a sensor configured to obtain a tilt angle of the bucket 33 relative to the horizontal line, e.g., a tilt (acceleration) sensor, to be specific. In this case, the bucket tilt angle sensor 63 may be attached to the link component 34 or to the bucket 33. The bucket tilt angle sensor 63 may be a rotational angle sensor configured to detect the rotational angle of a bucket connection pin (bucket base end) or a stroke sensor configured to detect a stroke amount of the bucket cylinder 43.

(Structure of Portable Terminal)

The portable terminal 3 is a terminal operated by an operator (e.g., an operator at a workplace). The portable terminal 3 may be a tablet terminal or a smartphone, for example. The portable terminal 3 and the working machine 2 can mutually communicate with each other.

(Structure of Camera)

As shown in FIG. 1, the camera 4 (surrounding state acquisition device) is configured to obtain a surrounding state 76 (see FIG. 3) of the working machine 2. In the present embodiment, the camera 4 is positioned to be able to obtain the surrounding state 76 of the attachment 30 from behind the attachment 30. The camera 4 is a mere example of the surrounding state acquisition device. Alternatively, the surrounding state acquisition device may be a LIDAR (Light Detection and Ranging). The camera 4 may be provided on the working machine 2 or may be provided at a location remote from the working machine 2.

(Circuit Configuration of Target Path Changing System)

Figure 2:
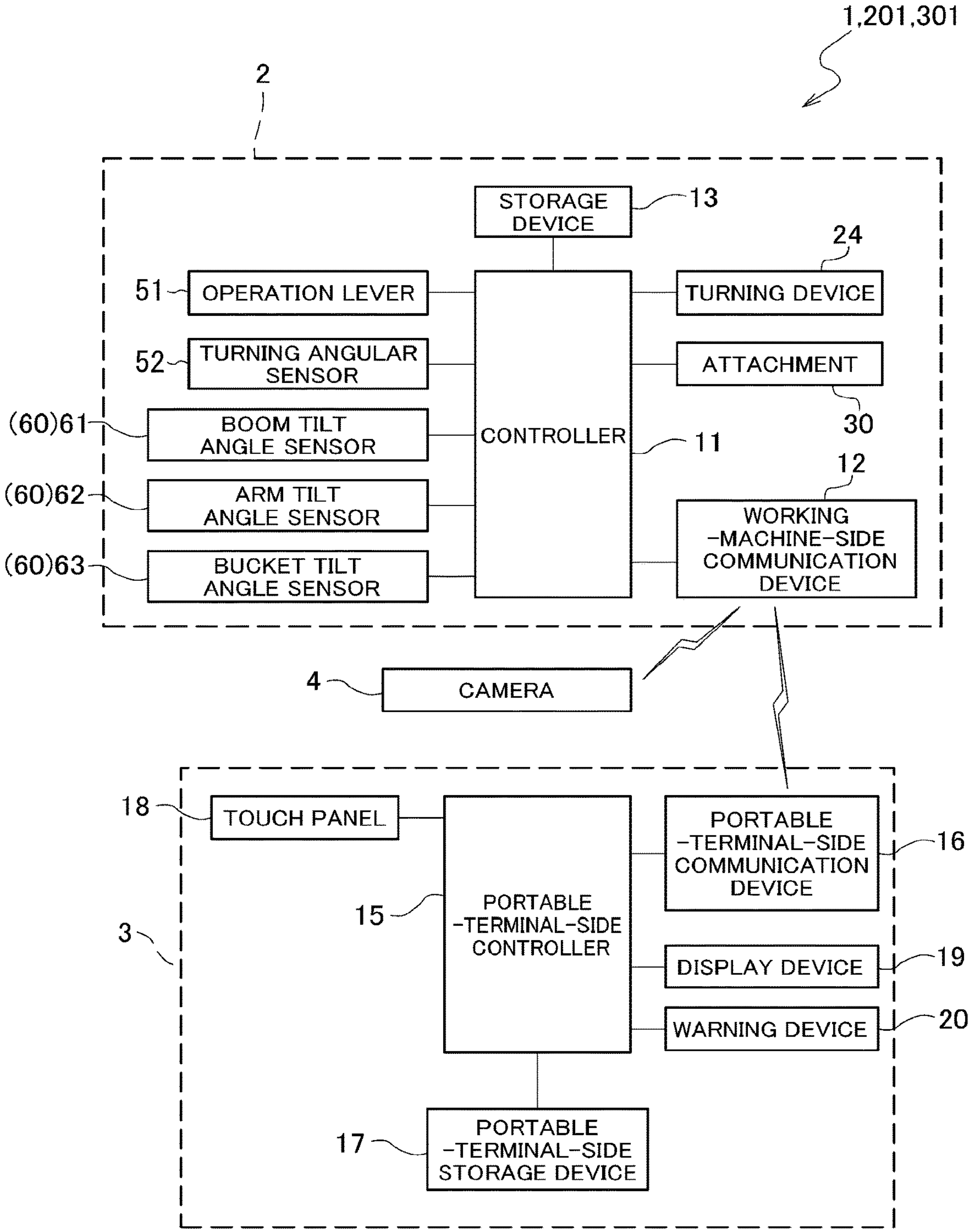
FIG. 2 shows a circuit diagram of the target path changing system.

As shown in FIG. 2 that is the circuit diagram of the target path changing system 1, the working machine 2 includes a controller 11, a working-machine-side communication device 12, and a storage device 13. The controller 11 functions as a target point setting unit, a target path resetting unit, and a specific interval changing unit (described later).

The controller 11 is configured to set a target path 71 (see FIG. 3) of the specific part of the attachment 30 (see FIG. 1). The specific part of the attachment 30 shown in FIG. 1 may be, for example, the leading end of the bucket 33 or the leading end of the arm 32. The explanation below presupposes that the specific part of the attachment 30 is the leading end of the bucket 33. The controller 11 (target point setting unit) shown in FIG. 2 is configured to set target points 72 at specific intervals on the target path 71 (see FIG. 3). The controller 11 sets the target points 72 at the specific intervals as information associated with the posture of the attachment 30 (see FIG. 1). The posture of the attachment 30 encompasses the turning angle θ of the upper turning body 22 (see FIG. 12). The specific intervals may be time intervals (specific time) or specific intervals of distance. The specific intervals are specific times in the present embodiment. In the present embodiment, each specific time is one second.

In the present embodiment, a target path 71 (see FIG. 3) is set by teaching with which the working machine 2 (see FIG. 1) is actually driven (on-line teaching). To be more specific, as the operator operates the operation lever 51, the turning device 24 and the attachment 30 are driven. While these members are driven, the turning angle θ (see FIG. 12) of the upper turning body 22 is detected by the turning angular sensor 52. Furthermore, the posture of the attachment 30 in this state is detected by the tilt angle sensor 60. The controller 11 sets the target path 71 (see FIG. 3) based on the detected turning angle θ of the upper turning body 22 (see FIG. 1) and the detected posture of the attachment 30. The specific intervals (to be more specific, specific times) are intervals of sampling (to be more specific, sampling times) of values detected by the turning angular sensor 52 and the tilt angle sensor 60.

Alternatively, the target path 71 (see FIG. 3) may be set in such a way that the working machine 2 is not actually driven and information of the turning angle θ (see FIG. 12) of the upper turning body 22 and information of the posture of the attachment 30 are input to the controller 11 (off-line teaching). In this case, for example, the target path 71 (see FIG. 3) is set by inputting information to the controller 11 at each specific interval.

Figure 4:
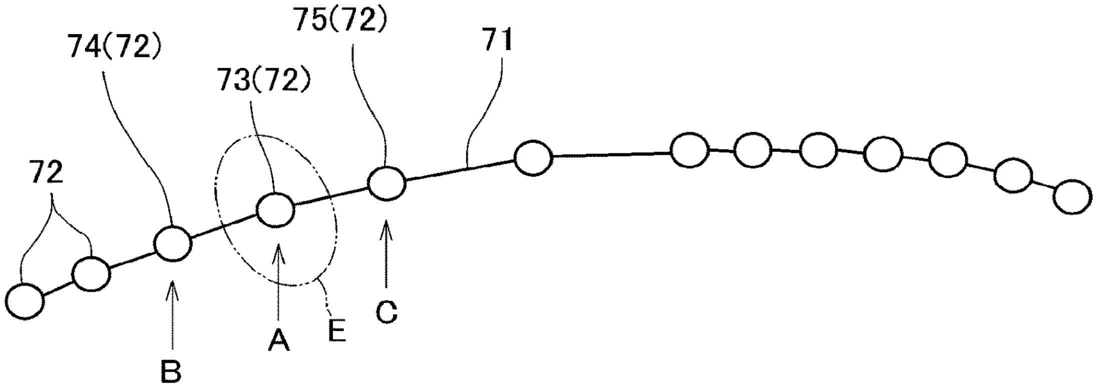
FIG. 4 shows a target path and target points displayed on the display of First Embodiment, and shows a state before movement of a change object point.

The controller 11 generates an automatic drive command based on the target path 71 (see FIG. 4) and the target points 72 (see FIG. 4). The automatic drive command is a command for automatically driving the turning device 24 and the attachment 30. The controller 11 is able to cause the turning device 24 and the attachment 30 to be automatically driven based on the automatic drive command. The working machine 2 is automatically driven based on the automatic drive command.

The working-machine-side communication device 12 is able to communicate with the portable terminal 3 (to be more specific, a later-described portable-terminal-side communication device 16). The storage device 13 is able to store the target path 71 (see FIG. 4) and the target points 72 (see FIG. 4) set by the controller 11.

The portable terminal 3 includes a portable-terminal-side controller 15, the portable-terminal-side communication device 16, a portable-terminal-side storage device 17, a touch panel 18, a display device 19, and a warning device 20. The portable-terminal-side controller 15 functions as an object point selection unit, a range setting unit, an object point movement unit, a change start point selection unit, a change end point selection unit, a first target point movement unit, a second target point movement unit, an object attachment selection unit, and a target posture change unit (described later).

Figure 3:
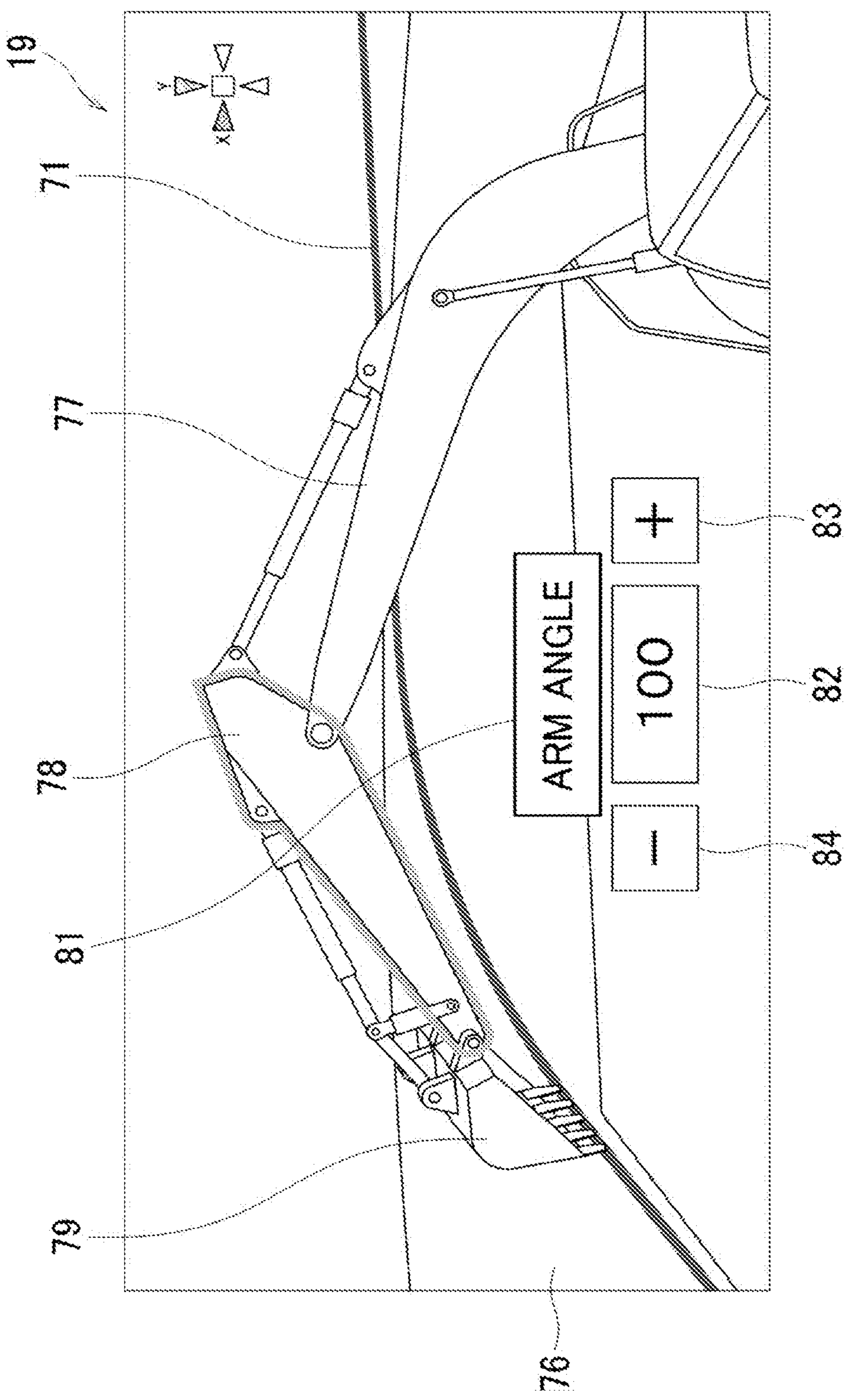
FIG. 3 shows a display screen of a display of First Embodiment.

The portable-terminal-side communication device 16 is able to communicate with the working-machine-side communication device 12 of the working machine 2. The portable-terminal-side controller 15 is configured to receive the target path 71 (see FIG. 4) and the target points 72 (see FIG. 4) from the working machine 2 through the portable-terminal-side communication device 16. As shown in FIG. 3 in which the display screen of the display device 19 is shown, the display device 19 displays a target path 71 and target points 72 (see FIG. 4). An example of the display device 19 is the display of the portable terminal 3. It is noted that FIG. 3 does not depict the target points 72 (see FIG. 4). As shown in FIG. 3, on the display device 19, the surrounding state 76 obtained by the camera 4 (see FIG. 1) overlaps the target path 71 and the target points 72 (see FIG. 4).

While the target path 71 shown in FIG. 3 is a target path when the working machine performs lifting turn. As the disclosure is not limited to this arrangement, the target path 71 may be a target path when the working machine performs returning turn. The lifting turn is an action in which the upper turning body 22 turns while an operation target (e.g., soil) scooped by the bucket 33 is retained by the bucket 33. The returning turn is an action in which the upper turning body 22 turns and the bucket 33 returns to the excavating position after the operation target (e.g., soil) retained by the bucket 33 is discharged from the bucket 33.

Referring back to FIG. 2, the portable-terminal-side storage device 17 is able to store the target path 71 (see FIG. 4) and the target points 72 (see FIG. 4) supplied from the working machine 2. The touch panel 18 (input device) receives an input from the operator. The touch panel 18 is a non-limiting example of the input device. The input device may be a keyboard, for example.

The warning device 20 outputs (generates) a warning when the distance between an obstacle and the target path 71 included in the surrounding state 76 shown in FIG. 3 is equal to or less than a predetermined value. For example, when the surrounding state 76 is updated, the warning device 20 outputs a warning if the distance between a newly-appeared obstacle and the target path 71 is equal to or less than the predetermined value. The warning device 20 may be a loudspeaker configured to output a warning by sound, may be a vibrator which is configured to vibrate, or may be arranged to output a warning by displaying an image on the display device 19.

The target path 71 and the target points 72 displayed on the display device 19 are shown in FIG. 4. As described above, after the target path 71 is set by, for example, teaching, the operator may wish to partially change the target path 71. For example, depending on the situation of the workplace, the operator may wish to partially change the target path 71 in accordance with the situation of the workplace in order to, for example, avoid an obstacle.

In this case, a changing mode is activated at the portable terminal 3 (see FIG. 2). In this changing mode, the portable-terminal-side controller 15 (object point selection unit shown in FIG. 2) allows the operator to select one of target points 72 as a change object point 73. The warning device 20 (see FIG. 2) prompts the operator to move a target point 72 which is about to make contact with an obstacle. The operator operates the touch panel 18 (see FIG. 2) to select a change object point 73. To be more specific, the operator touches a portion of the touch panel 18, where a target point 72 to be selected as the change object point 73 is displayed. In FIG. 4, the target point 72 indicated by the arrow A is selected as the change object point 73.

Subsequently, the portable-terminal-side controller 15 (change start point selection unit) (see FIG. 2) allows the operator to select one of target points 72 forward of the change object point 73 as a change start point 74. The operator operates the touch panel 18 (see FIG. 2) to select a change start point 74. To be more specific, the selection of the change start point 74 is performed by a touch of a portion of the touch panel 18, which overlaps a desired target point 72 displayed on the display device 19. In FIG. 4, the target point 72 indicated by the arrow B and is next to the change object point 73 is selected as the change start point 74.

Subsequently, the portable-terminal-side controller 15 (change end point selection unit) (see FIG. 2) allows the operator to select one of target points 72 rearward of the change object point 73 as a change end point 75. The operator operates the touch panel 18 (see FIG. 2) to select a change end point 75. To be more specific, the selection of the change end point 75 is performed by a touch of a portion of the touch panel 18, which overlaps a desired target point 72 displayed on the display device 19. In FIG. 4, the target point 72 indicated by the arrow C and is next to the change object point 73 is selected as the change end point 75.

Subsequently, the portable-terminal-side controller 15 (range setting unit) (see FIG. 2) sets a range in which the change object point 73 is movable as a movable range E. The movable range E is set based on information of the posture of the attachment 30 (see FIG. 2) at at least one of the change object point 73, the change start point 74, or the change end point 75. For example, the information of the posture of the attachment 30 at the change start point 74 is information of the posture of the attachment 30 when it is assumed that the specific part of the attachment 30 is positioned at the change start point 74. (The same applies to the change object point 73 and the change end point 75.) The movable range E may be set based on a direction relative to the upper turning body 22 (see Third Embodiment). The following will describe a case where the movable range E is set based on information of the posture of the attachment 30 at at least one of the change object point 73, the change start point 74, or the change end point 75.

In the example shown in FIG. 4, there are target points 72 forward of and rearward of the change object point 73 indicated by the arrow A, respectively. In this example, the movable range E is set based on information of the posture of the attachment 30 at both of the change start point 74 and the change end point 75. On the other hand, when the change object point 73 is a target point 72 at one of the ends of the target path 71, this target point 72 has only one neighboring target point 72 which is in front of or behind that target point 72. In this case, the movable range E is set based on information of the posture of the attachment 30 (see FIG. 2) at one of the change start point 74 and the change end point 75. For example, the movable range E may be set based on a possible posture of the attachment 30 when it is assumed that the specific part of the attachment 30 is positioned at the change object point 73. (More specifically, the movable range E may be set based on a physically possible posture.)

The following will describe a specific example of the movable range E when the movable range E is set based on the information of the posture of the attachment 30. As described above, in the present embodiment, each specific time is one second. On this account, the posture of the attachment 30 (see FIG. 2) needs to be changed in one second from the posture at the change start point 74 to the posture at the change object point 73 after the movement, and then to be changed in one second from the posture at the change object point 73 after the movement to the posture at the change end point 75. The movable range E is a range in which the change object point 73 is movable while the need described above is satisfied. To be more specific, the movable range E is set based on the speed of extension and contraction of the rod of the cylinder 40 (see FIG. 1), the turning speed of the upper turning body 22 (see FIG. 1), and the movable range of the rod of the cylinder 40 at the change start point 74 and the change end point 75. To be further specific, a possible posture of the attachment 30 at the change object point 73 is figured out based on, for example, the speed of extension and contraction of the rod of the cylinder 40 at the change start point 74 and the change end point 75, and the movable range E is set based on this posture.

Subsequently, the portable-terminal-side controller 15 (object point movement unit) (see FIG. 2) allows the operator to move the change object point 73 within the movable range E. The following will describe a specific example of this movement.

Specific Example 1

The display device 19 displays an image including a target path 71 and target points 72 as shown in FIG. 4. In this displayed image, the operator may select a change object point 73 from the target points 72 and move the change object point 73 (see FIG. 5) by, for example, making an input to the touch panel 18 (see FIG. 2).

There are cases where the operator tries to move a change object point 73 from the inside of the movable range E to the outside of the movable range E. In such cases, it is preferable to get the operator to intuitively recognize that he or she is trying to move the change object point 73 from the inside of the movable range E to the outside of the movable range E. To be more specific, in this case, the portable-terminal-side controller 15 (see FIG. 2) changes the display state of the image on the display device 19 (see FIG. 2). To be more specific, for example, the display device 19 may display a text or a figure. For example, the display device 19 may change the display state of the target path 71 or the change object point 73. For example, the display device 19 may change the change object point 73 to be translucent, may change the color of the change object point 73, or may change the display state of the target path 71.

Specific Example 2

As shown in FIG. 3, the display device 19 (see FIG. 3) displays an image including the attachment 30 (see FIG. 1) and a target path 71. The operator moves the image of the attachment 30 (see FIG. 1) by making an input. In accordance with the movement of the image, the change object point 73 may be changed. This Specific Example 2 will be detained below.

To begin with, the portable-terminal-side controller 15 (object attachment selection unit) (see FIG. 2) allows the operator to select, as an object attachment, at least one of the boom 31, the arm 32, or the bucket 33 shown in FIG. 1. The operator operates the touch panel 18 (see FIG. 2) to select the object attachment. In this connection, in the lifting turn, if the bucket 33 holding the operation target (e.g., soil) is rotated in the up-down direction, the operation target may drop off. On this account, in FIG. 3, the arm 32 (see FIG. 1) is selected as the object attachment as an arm image 78 corresponding to the arm 32 is selected. It is noted that the boom 31 (see FIG. 1) corresponds to a boom image 77 and the bucket 33 (see FIG. 1) corresponds to a bucket image 79 (leading-end attachment image).

When at least one of the boom 31, the arm 32, or the bucket 33 shown in FIG. 1 is selected as the object attachment, information regarding the selected object attachment is displayed on the display device 19 shown in FIG. 3. The following will describe an example in which the arm 32 is selected as the object attachment. On the display screen of the display device 19, a text image 81 is displayed to indicate that the arm 32 is the object attachment. In addition to this, the display device 19 displays a number image 82 indicating the value of an arm angle which is currently set. In FIG. 3, the value of the arm angle is "100". Moreover, the display device 19 displays an increase button image 83 used for increasing the value of the arm angle and a decrease button image 84 used for decreasing the value of the arm angle.

Subsequently, the portable-terminal-side controller 15 (target posture change unit) (see FIG. 2) allows the operator to change the target posture of the object attachment in order to move the change object point 73 shown in FIG. 4. To be more specific, the portable-terminal-side controller 15 allows the operator to change the target posture of the object attachment (i.e., functions as the target posture change unit) and moves the change object point 73 based on the change of the target posture (i.e., functions as the object point movement unit). For example, the operator touches the increase button image 83 or the decrease button image 84 shown in FIG. 3 to change the value of the arm angle. As a result of the change of the target posture of the object attachment, the change object point 73 shown in FIG. 4 is moved.

When the operator changes the target posture of the object attachment, the operator may try to move the specific part of the attachment 30 from the inside of the movable range E to the outside of the movable range E. In such cases, it is preferable to get the operator to intuitively recognize that he or she is trying to move the position of the specific part from the inside of the movable range E to the outside of the movable range E. Specifically, the portable-terminal-side controller 15 may change the display state of the attachment 30, the display state of the object attachment, the display state of the change object point 73, or the display state of the target path 71. To be more specific, for example, the portable-terminal-side controller 15 may change the object attachment to be translucent.

Figure 5:
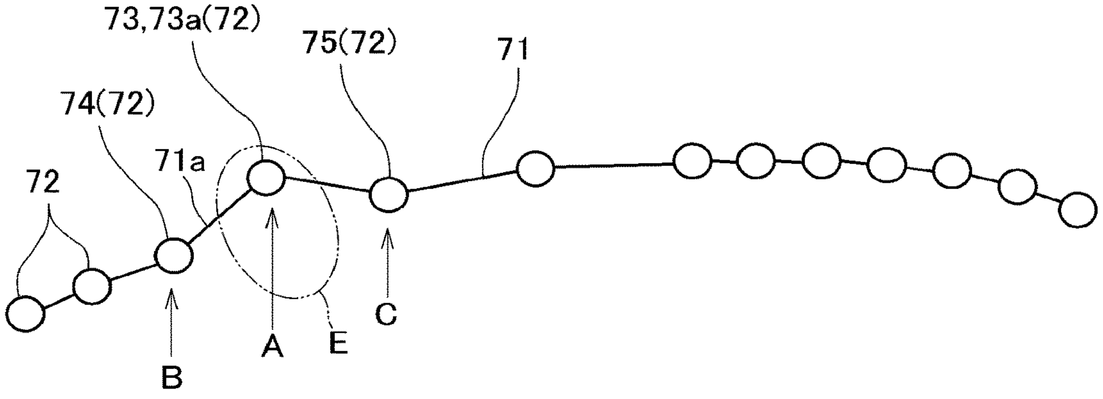
FIG. 5 shows a target path and target points displayed on the display of First Embodiment, and shows a state after movement of a change object point.

FIG. 5 shows the target path 71 and target points 72 displayed on the display device 19 (see FIG. 3) after the movement of the change object point 73. As a result of the movement of the change object point 73, the target path 71 is partially reset (changed). To be more specific, the controller 11 of the working machine 2 receives, from the portable terminal 3, the change object point 73 after the movement, the change start point 74, and the change end point 75. The controller 11 (target path resetting unit) resets a part of the target path 71 between the change start point 74 and the change end point 75 so that the target path 71 passes through the change object point 73 after the movement (see a target path 71*a* after the reset).

Figure 7:
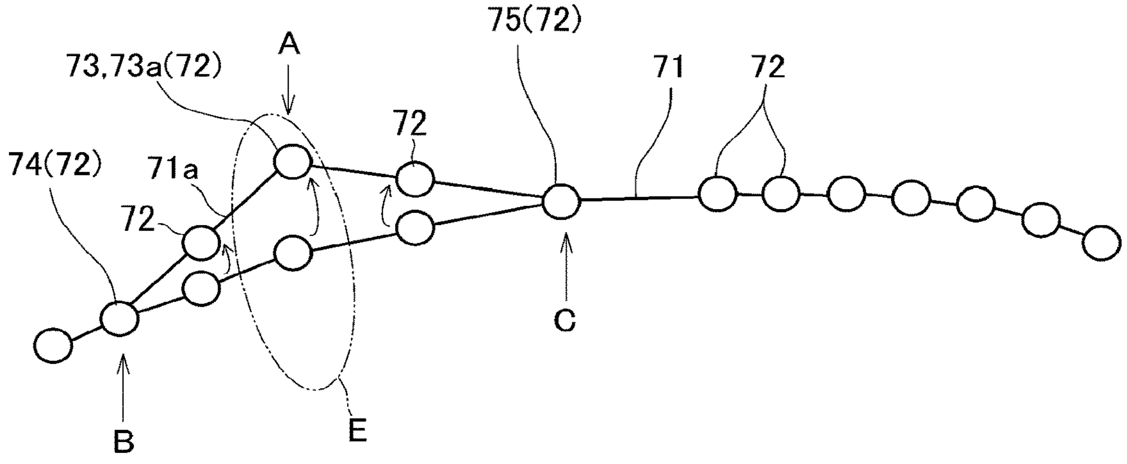
FIG. 7 shows a target path and target points displayed on the display of First Embodiment, and shows a state before and after movement of change object points.

FIG. 7 shows the target path 71 and target points 72 displayed on the display device 19. Assume that there is at least one (e.g., one) target point 72 between the target point 72 that is selected as the change start point 74 and the change object point 73 and there is at least one (e.g., one) target point 72 between the change object point 73 and the target point 72 that is selected as the change end point as shown in FIG. 7.

A case where a target point 72 that is forward of or rearward of the change object point 73 and is close to the change object point 73 is selected as the change start point 74 or the change end point 75 (case A) is compared with a case where a target point 72 that is forward of or rearward of the change object point 73 and is far from the change object point 73 is selected as the change start point 74 or the change end point 75 (case B). The time required for movement from the change start point 74 to the change end point 75 via the change object point 73 is longer in the case B than in the case A. The longer the time required for the movement is, the wider the movable range E of the change object point 73 is. On this account, the farther the target point 72 selected as the change start point 74 or the change end point 75 is from the change object point 73 in the forward or rearward direction, the wider the movable range E of the change object point 73 is.

(Operation of Target Path Changing System)

Figure 8:
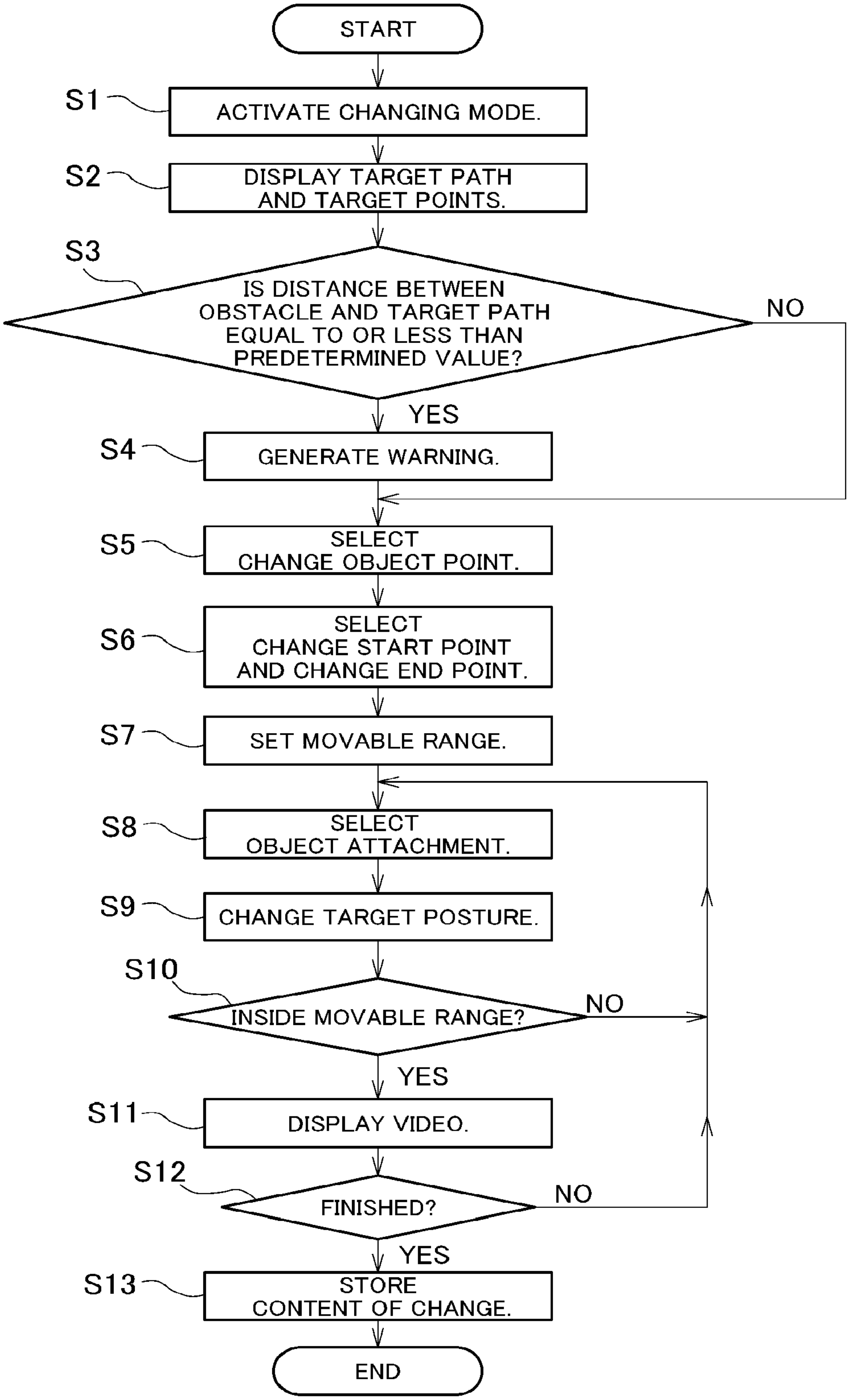
FIG. 8 shows a flowchart of a target path changing process.

The following will describe how the target path changing system 1 (see FIG. 2) operates, with reference to FIG. 8 which is a flowchart of the target path changing process. It is noted that the steps S1 to S13 of the flowchart will be described with reference to FIG. 8.

To begin with, the portable-terminal-side controller 15 of the portable terminal 3 shown in FIG. 2 activates the changing mode (step S1). The portable-terminal-side storage device 17 of the portable terminal 3 stores the target path 71 (see FIG. 4) and the target points 72 (see FIG. 4) supplied from the working machine 2. The portable-terminal-side controller 15 then displays the target path 71 and target points 72 on the display device 19 (step S2). In this state, as shown in FIG. 3, the surrounding state 76 is overlapped on the image displayed on the display device 19. Subsequently, the portable-terminal-side controller 15 shown in FIG. 2 determines whether the distance between an obstacle and the target path 71 (see FIG. 3) included in the surrounding state 76 (see FIG. 3) is not longer than a predetermined value (step S3).

When it is determined in the step S3 that the distance between the obstacle and the target path 71 (see FIG. 3) included in the surrounding state 76 (see FIG. 3) is not longer than the predetermined value (YES in S3), the portable-terminal-side controller 15 generates a warning by means of the warning device 20 (step S4). The portable-terminal-side controller 15 then proceeds to the step S5. On the other hand, when it is determined in the step S3 that the distance between the obstacle and the target path 71 (see FIG. 3) included in the surrounding state 76 (see FIG. 3) is longer than the predetermined value (NO in S3), the portable-terminal-side controller 15 proceeds to the step S5.

In the step S5, the portable-terminal-side controller 15 allows the operator to select a change object point 73 (see FIG. 4) (step S5). Subsequently, the portable-terminal-side controller 15 allows the operator to select a change start point 74 (see FIG. 4) and a change end point 75 (see FIG. 4) (step S6).

Subsequently, the portable-terminal-side controller 15 sets a movable range E (step S7). Subsequently, the portable-terminal-side controller 15 allows the operator to select an object attachment (step S8). The portable-terminal-side controller 15 then allows the operator to change the target posture of the object attachment (step S9).

Subsequently, the portable-terminal-side controller 15 determines whether the target posture of the object attachment after the change is encompassed in the movable range E (see FIG. 4) (step S10). When it is determined in the step S10 that the target posture of the object attachment after the change is not encompassed in the movable range E (NO in the step S10), the portable-terminal-side controller 15 goes back to the step S8 (or may go back to the step S9). The operator further changes the target posture of the object attachment so that the target posture of the object attachment after the change is encompassed in the movable range E. In this example, the target posture of the object attachment is changed to be outside the movable range E and then changed to be inside in the movable range E. Alternatively, the target posture of the object attachment may be changeable only within the movable range E.

Figure 6:
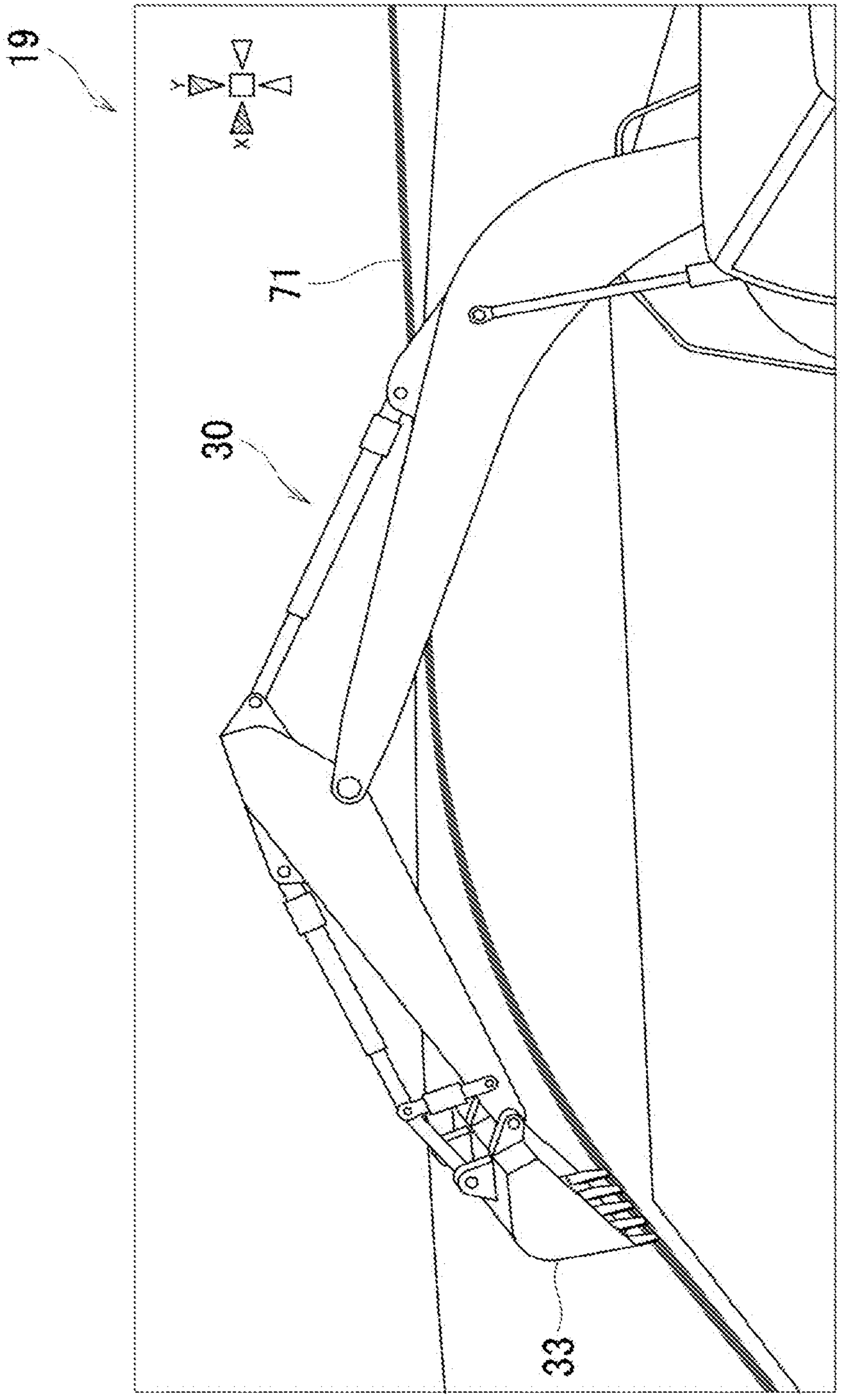
FIG. 6 shows an image displayed on the display at a moment in a video showing a moving attachment.

On the contrary, when it is determined in the step S10 that the target posture of the object attachment after the change is inside the movable range E (see FIG. 4) (YES in the step S10), the portable-terminal-side controller 15 proceeds to the step S11. Subsequently, as shown in FIG. 6, the portable-terminal-side controller 15 displays, on the display device 19, a video in which the attachment 30 moves while the leading end of the bucket 33 is kept on the target path 71 (step S11).

Subsequently, the portable-terminal-side controller 15 shown in FIG. 2 determines whether the operator has instructed to end the change of the target path 71 (see FIG. 3) (step S12). When it is determined in the step S12 that the operator has not instructed to end the change (NO in S12), the portable-terminal-side controller 15 goes back to the step S8. On the contrary, when it is determined in the step S12 that the operator has instructed to end the change (YES in S12), the portable-terminal-side controller 15 stores the content of the change in the portable-terminal-side storage device 17 (step S13) and terminates the flow.

(Effect of First Aspect)

The effects of the target path changing system 1 of the attachment 30 shown in FIG. 1 are as follows. The target path changing system 1 is used for the working machine 2. The working machine 2 includes the lower running body 21, the upper turning body 22, and the attachment 30. The upper turning body 22 is rotatably attached to an upper part of the lower running body 21. The attachment 30 is attached to the upper turning body 22. The target path changing system 1 includes the target point setting unit, the display device 19 shown in FIG. 3, the object point selection unit, the range setting unit, the object point movement unit, and the target path resetting unit. The target point setting unit (e.g., the controller 11 shown in FIG. 2) is configured to set the target points 72 (see FIG. 4) at the specific intervals on the target path 71 of the specific part of the attachment 30 (see FIG. 1). The display device 19 displays the target path 71 and target points 72 (see FIG. 4).

[Arrangement 1] The object point selection unit (e.g., the portable-terminal-side controller 15 shown in FIG. 2) allows the operator to select one of the target points 72 shown in FIG. 4 as a change object point 73. The range setting unit (e.g., the portable-terminal-side controller 15) sets the movable range E in which the change object point 73 is movable. The object point movement unit (e.g., the portable-terminal-side controller 15) allows the operator to move the change object point 73 within the movable range E. The target path resetting unit (e.g., the portable-terminal-side controller 15) resets a part of the target path 71 between the change start point 74 and the change end point 75 so that the target path 71 passes through an after-movement change object point 73*a* shown in FIG. 5 (see a target path 71*a* after the reset). The after-movement change object point 73*a* is the change object point 73 after the movement. The change start point 74 is a target point 72 forward of the change object point 73. The change end point 75 is a target point 72 rearward of the change object point 73.

The arrangement 1 described above exerts the effects described below. When the operator wishes to partially change the target path 71 of the leading end of the bucket 33 (see FIG. 1) (in order to, for example, correspond to the workplace), the operator selects one of the target points 72 shown in FIG. 4 as the change object point 73. The operator then moves the change object point 73 within the movable range E. As shown in FIG. 5, when the change object point 73 is moved, the target path 71 is reset (changed) so that the target path 71 passes through the after-movement change object point 73*a* (see the target path 71*a* after the reset). On this account, it is unnecessary to entirely reset the target path 71 when the target path 71 is only partially changed. (In other words, only reset of a part of the target path 71 is required.) It is therefore possible to improve the working efficiency of the operation of changing the target path 71 of the specific part of the attachment 30 (see FIG. 3).

(Effects of Second Aspect)

[Arrangement 2] The target point setting unit (e.g., the controller 11 shown in FIG. 2) sets the target points 72 shown in FIG. 4 as information associated with the posture of the attachment 30 (see FIG. 1). Based on the information of the posture of the attachment 30 at at least one of the change start point 74, the change end point 75, or the change object point 73, the range setting unit (e.g., the portable-terminal-side controller 15 shown in FIG. 2) sets the movable range E.

In the arrangement 2, based on the information of the posture of the attachment 30 (see FIG. 1) at at least one of the change start point 74, change end point 75, or the change object point 73, the movable range E of the change object point 73 is set. It is therefore possible to properly limit the movable range E as compared to a case where the change object point 73 is movable (e.g., to any position) without referring to the information of the posture of the attachment 30. For example, the movable range E may be arranged to exclude positions of the change object point 73 where the posture of the attachment 30 is physically impossible. For example, rapid movement of the attachment can be suppressed by properly limiting the movable range E.

(Effects of Fourth Aspect)

[Arrangement 4] The target path changing system 1 (see FIG. 2) includes the change start point selection unit and the change end point selection unit. The change start point selection unit (e.g., the portable-terminal-side controller shown in FIG. 2) allows the operator to select one of target points 72 forward of the change object point 73 shown in FIG. 7 as a change start point 74. The change end point selection unit (e.g., the portable-terminal-side controller allows the operator to select one of target points 72 rearward of the change object point 73 as a change end point 75.

The arrangement 4 allows the operator to arbitrarily select the change start point 74 and the change end point 75. It is therefore possible to easily change the range of the target path 71 that is to be reset (see the target path 71*a* after the reset).

When the target path changing system 1 has the arrangement 4 and the arrangement 2 described above, the following effect may be attained. In the arrangement 2, based on the information of the posture of the attachment 30 at at least one of the change start point 74, the change end point 75, or the change object point 73, the movable range E is set. The arrangement assumes that the movable range E is set based on a possible posture of the attachment 30 when the specific part of the attachment 30 is provided at the change object point 73. Based on this assumption, a case where a target point 72 that is forward of or rearward of the change object point 73 and is close to the change object point 73 is selected as the change start point 74 or the change end point 75 (case A) is compared with a case where a target point 72 that is forward of or rearward of the change object point 73 and is far from the change object point 73 is selected as the change start point 74 or the change end point 75 (case B). The time required for movement from the change start point 74 to the change end point 75 via the change object point 73 is longer in the case B than in the case A. The longer this time is, the wider the range of the possible posture of the attachment 30 is when the specific part of the attachment 30 is provided at the change object point 73, with the result that the movable range E of the change object point 73 is widened. On this account, the farther the target point 72 selected as the change start point 74 or the change end point 75 is from the change object point 73 in the forward or rearward direction, the wider the movable range E of the change object point 73 is.

(Effects of Fifth Aspect)

[Arrangement 5] The target path changing system 1 (see FIG. 2) includes the first target point movement unit and the second target point movement unit. The first target point movement unit (e.g., the portable-terminal-side controller shown in FIG. 2) performs the following process when a target point 72 exists between the change start point 74 and the after-movement change object point 73*a*. In this case, the first target point movement unit moves the target point 72 between the change start point 74 and the after-movement change object point 73*a* to a point on a line connecting the change start point 74 with the after-movement change object point 73*a*. The second target point movement unit (e.g., the portable-terminal-side controller 15) performs the following process when a target point 72 exists between the change end point 75 and the after-movement change object point 73*a*. In this case, the second target point movement unit moves the target point 72 between the change end point 75 and the after-movement change object point 73*a* to a point on a line connecting the change end point 75 with the after-movement change object point 73*a*.

Due to the arrangement 5, when there is a target point 72 between the change start point 74 and the change object point 73, this target point 72 is moved to a point on the line connecting the change start point 74 with the change object point 73 after the movement. The same applies to a case where a target point 72 exists between the change object point 73 and the change end point 75. On this account, the operator is not required to move the target point 72 between the change object point 73 and the change start point 74 and the target point 72 between the change object point 73 and the change end point 75.

(Effects of Ninth Aspect)

[Arrangement 9] The display device 19 shown in FIG. 3 changes the display state of the display device 19 when the object point movement unit (e.g., the portable-terminal-side controller 15) is trying to move a change object point 73 from the inside of the movable range E to the outside of the movable range E.

By changing the display state of the display device 19, this arrangement 9 allows the operator to intuitively recognize that the operator is trying to move the change object point 73 out from the movable range E.

[Effects of Tenth Aspect]

As shown in FIG. 1, the attachment 30 includes the boom 31, the arm 32, and the bucket 33 (leading-end attachment). The boom 31 is attached to the upper turning body 22 to be rotatable in the up-down direction. The arm 32 is attached to the boom 31 to be rotatable in the up-down direction. The bucket 33 is attached to the arm 32 to be rotatable.

[Arrangement 10] The object point movement unit (e.g., the portable-terminal-side controller 15 shown in FIG. 2) includes the object attachment selection unit and the target posture change unit. The object attachment selection unit (e.g., the portable-terminal-side controller 15) allows the operator to select, as an object attachment, at least one of the boom 31, the arm 32, or the bucket 33. The target posture change unit (e.g., the portable-terminal-side controller 15) allows the operator to change the target posture of the object attachment in order to move the change object point 73 (see FIG. 4).

The arrangement 10 described above allows the operator to select, as an object attachment, at least one of the boom 31, the arm 32, or the bucket 33 shown in FIG. 1 (see FIG. 3). As the operator changes the target posture of the object attachment, the change object point 73 (see FIG. 5) is moved. As such, the change object point 73 is moved as the operator changes the target posture of a desired object attachment.

(Effects of Thirteenth Aspect)

[Arrangement 13] As shown in FIG. 1, the target path changing system 1 includes the camera 4 (surrounding state acquisition device) which is configured to obtain the surrounding state 76 (see FIG. 3) of the working machine 2. As shown in FIG. 3, on the display device 19, the surrounding state 76 obtained by the camera 4 (see FIG. 1) overlaps the target path 71 and the target points 72 (see FIG. 4).

The arrangement 13 allows the operator to easily grasp the relative positions of the target path 71 and the surrounding state 76 based on the image display in which the target path 71 and the surrounding state 76 are overlapped as shown in FIG. 3. As a result, for example, the operator is able to easily find a target point 72 (see FIG. 4) where the attachment 30 may make contact with an obstacle.

(Effects of Fourteenth Aspect)

[Arrangement 14] The target path changing system 1 includes the warning device 20 as shown in FIG. 2. The warning device 20 outputs a warning when the distance between an obstacle and the target path 71 included in the surrounding state 76 shown in FIG. 3 is equal to or less than a predetermined value.

The arrangement 14 described above makes it possible to warn the operator that the distance between an obstacle and the target path 71 is equal to or shorter than a predetermined value. As a result, the operator is notified of the movement a target point 72 (see FIG. 4) with which the attachment 30 may make contact with the obstacle.

(Effects of Fifteenth Aspect)

[Arrangement 15] As shown in FIG. 6, the display device 19 displays a video in which the attachment 30 moves while the specific part is positioned on the target path 71.

When a change object point 73 (see FIG. 5) is moved, the arrangement 15 described above allows the operator to see, in the video, the movement of the attachment 30 along the target path 71 after the change. The operator is therefore able to check how the result of the movement of the change object point 73 (see FIG. 4) influences on the movement of the attachment 30.

(Effects of Eighteenth Aspect)

[Arrangement 18] As shown in FIG. 2, the target path changing system 1 includes the portable terminal 3 that is capable of mutually communicating with the working machine 2. The portable terminal 3 includes the display device 19, the object point selection unit (see the arrangement 1 described above), and the object point movement unit (see the arrangement 1 described above).

Due to the arrangement 18 described above, the portable terminal 3 displays the target path 71 and the target points 72 shown in FIG. 4. On this account, for example, it is possible to check the target path 71 of the leading end of the bucket 33 (see FIG. 1) by using the portable terminal 3 (see FIG. 1) which is provided at a location remote from the working machine 2 (see FIG. 1). By making an input to the portable terminal 3, the operator selects a change object point 73 and moves the change object point 73 within the movable range E. On this account, for example, it is possible to change a part of the target path 71 by using the portable terminal 3 which is provided at a location remote from the working machine 2.

Second Embodiment

The following will describe a target path changing system 201 of Second Embodiment with reference to drawings. It is noted that arrangements in common with First Embodiment (e.g., common features and effects thereof) are not explained and differences from First Embodiment will be explained (the same applies to later-described Third Embodiment, too). Members of the target path changing system 201 of Second Embodiment, which are identical with those of First Embodiment, are denoted by the same reference numbers as those in First Embodiment (the same applies to later-described Third Embodiment).

(Structure of Target Path Changing System 201)

In the target path changing system 1 of First Embodiment, as shown in FIG. 3, the target path 71 is partially changed in such a way that the operator is allowed to select an object attachment and to change its target posture.

Figure 9:
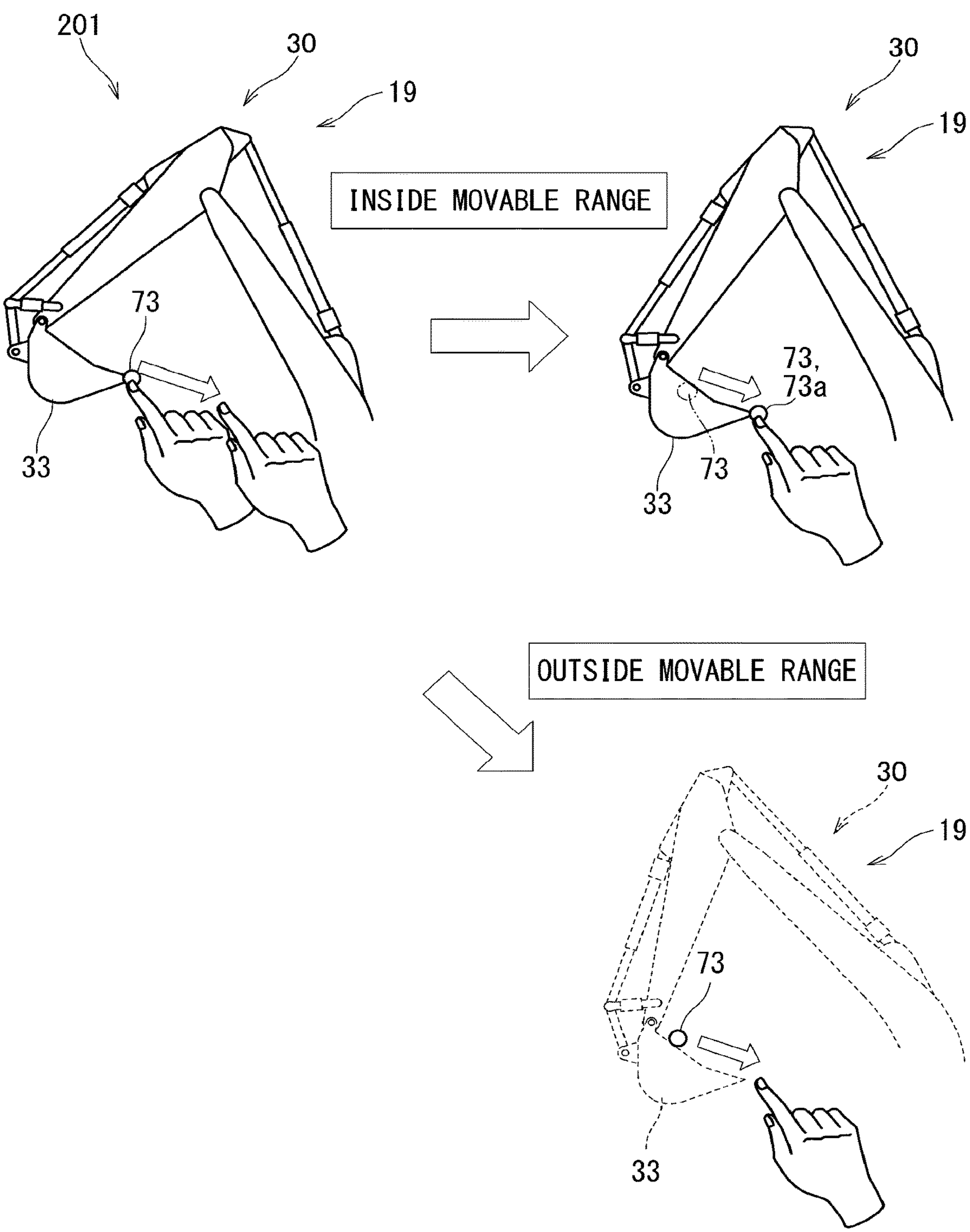
FIG. 9 shows a display screen of a display of Second Embodiment.

As shown in FIG. 9 depicting the display screen of the display device 19 of the portable terminal 3 (see FIG. 2), in the target path changing system 201 of the present embodiment, the display device 19 displays an image in which the leading end of the bucket 33 (i.e., the specific part of the attachment 30) is positioned at a change object point 73. Thereafter, in accordance with an input to the touch panel 18 (see FIG. 2) by the operator, the display device 19 displays an image in which the position of the leading end of the bucket 33 is moved. In FIG. 9, as the operator makes an input so that the leading end of the bucket 33 moves rightward, the position of the leading end of the bucket 33 is moved rightward in the image. It is noted that this image is displayed in a case where the movement of the change object point 73 in response to the input by the operator is performed within the movable range E.

In accordance with the position of the leading end of the bucket 33 after the movement, the portable-terminal-side controller 15 (see FIG. 2) of the portable terminal 3 (see FIG. 2) moves the change object point 73. This allows the operator to intuitively moves the change object point 73 based on a visual change in the image.

In regard to the above, when the position of the leading end of the bucket 33 is moved from within the movable range E to the outside of the movable range E in the image, the display device 19 changes the display state of the image. For example, when the position of the leading end of the bucket 33 moves out from the movable range E, the image of the attachment 30 may be changed to translucent or the line indicating the attachment 30 may be altered (e.g., narrowed or changed from a solid line to a dotted line). By changing the display state of the image on the display device 19, it is possible to allow the operator to intuitively recognize that the change object point 73 cannot be moved to that position.

Figure 10:
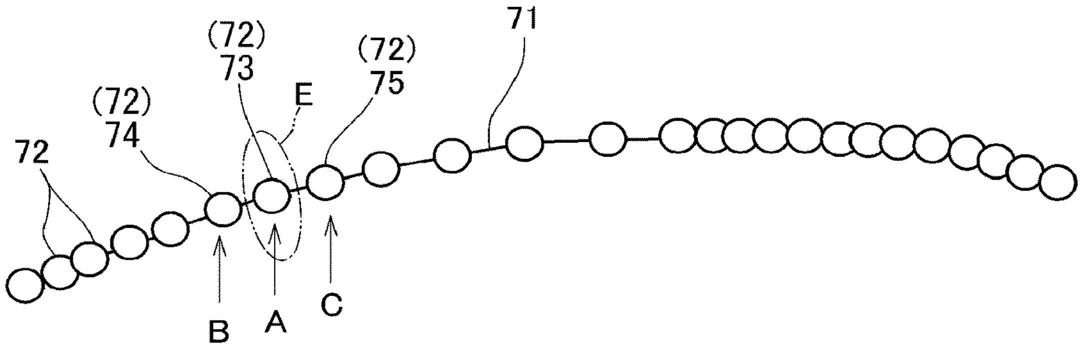
FIG. 10 shows a target path and target points displayed on the display of Second Embodiment, and shows a case where a specific time is short as compared to First Embodiment.

The controller 11 (specific interval changing unit) (see FIG. 2) of the working machine 2 (see FIG. 2) allows the operator to change the specific intervals (e.g., specific times). The portable-terminal-side controller 15 (see 2) may allow the operator to change the specific intervals. The change of the specific intervals may be done by, for example, using an input device and a monitor (not illustrated) of the working machine 2 or using the touch panel 18 and the display device 19 of the portable terminal 3 (see FIG. 2). FIG. 10 shows the target path 71 and the target points 72 displayed on the display device 19. The following will describe a specific case where the specific interval is a specific time. As shown in FIG. 10, when, for example, the specific time is changed from 1 second to 0.5 second, the number of target points 72 in a given period of time is doubled (see FIG. 4 and FIG. 10). As such, because the number of target points 72 in a given period of time is increased by shortening the specific time, it becomes possible to change the target path 71 finely (i.e., in a detailed manner).

Figure 11:
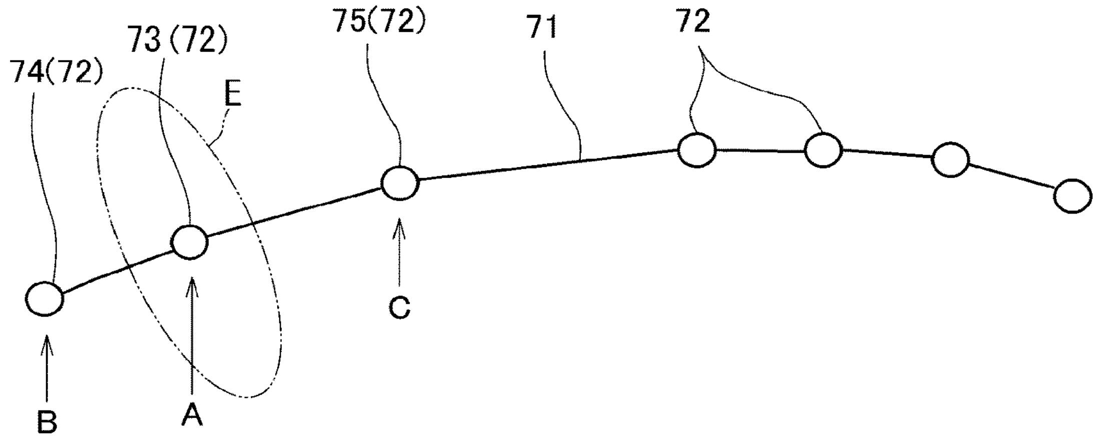
FIG. 11 shows a target path and target points displayed on the display of Second Embodiment, and shows a case where a specific time is long as compared to First Embodiment.

FIG. 11 shows the target path 71 and the target points 72 displayed on the display device 19. For example, when the specific time is changed from 1 second to 2 seconds, the number of target points 72 in a given period of time is halved (see FIG. 4 and FIG. 11). As such, when the specific time is elongated, the time required for movement from the change start point 74 to the change end point 75 via the change object point 73 is elongated. The longer the time required for the movement is, the wider the movable range E of the change object point 73 is. On this account, the movable range E of the change object point 73 can be widened by elongating the specific time. It is noted that, when, for example, the specific interval is a distance, the target path 71 can be finely set when the specific interval is shortened. On the other hand, the movable range E can be widened when the specific interval is elongated.

(Effects)

The following effects can be attained by the target path changing system 201 of the present embodiment.

(Effects of Fifth Aspect)

[Arrangement 6] The target path changing system 201 shown in FIG. 2 includes the specific interval changing unit (e.g., the portable-terminal-side controller 15) that allows the operator to change the specific interval.

In the arrangement 6 described above, the specific interval is changed by the operator. As shown in FIG. 10, because the number of target points 72 in a given period of time or a given distance is increased by shortening the specific interval (see FIG. 4 and FIG. 10), it becomes possible to change the target path 71 finely. Furthermore, when the specific interval is elongated, the time required for movement from the change start point 74 to the change end point 75 via the change object point 73 is elongated as shown in FIG. 11. The longer the time required for the movement is, the wider the movable range E of the change object point 73 is. On this account, the movable range E of the change object point 73 can be widened by elongating the specific interval.

[Effects of Eleventh Aspect]

[Arrangement 11] As shown in FIG. 9, the display device 19 shows an image in which the leading end (specific part) of the bucket 33 of the attachment 30 is positioned at a change object point 73. The display device 19 displays the image in which the position of the leading end (specific part) of the bucket 33 moves in response to an input from the operator. The object point movement unit (e.g., the portable-terminal-side controller 15 shown in FIG. 2) moves the change object point 73 in accordance with the position of the leading end of the bucket 33 after the movement in the image.

This arrangement 11 allows the operator to intuitively move the change object point 73 based on a visual change in the image.

[Effects of Twelfth Aspect]

[Arrangement 12] When the position of the leading end (specific part) of the bucket 33 is moved from within the movable range E (see FIG. 4) to the outside of the movable range E in the image, the display device 19 changes the display state of the image.

The arrangement 12 described above allows the operator to intuitively recognize that the position of the leading end of the bucket 33 has been moved from within the movable range E (see FIG. 4) to the outside of the movable range E in the image.

Third Embodiment

Figure 12:
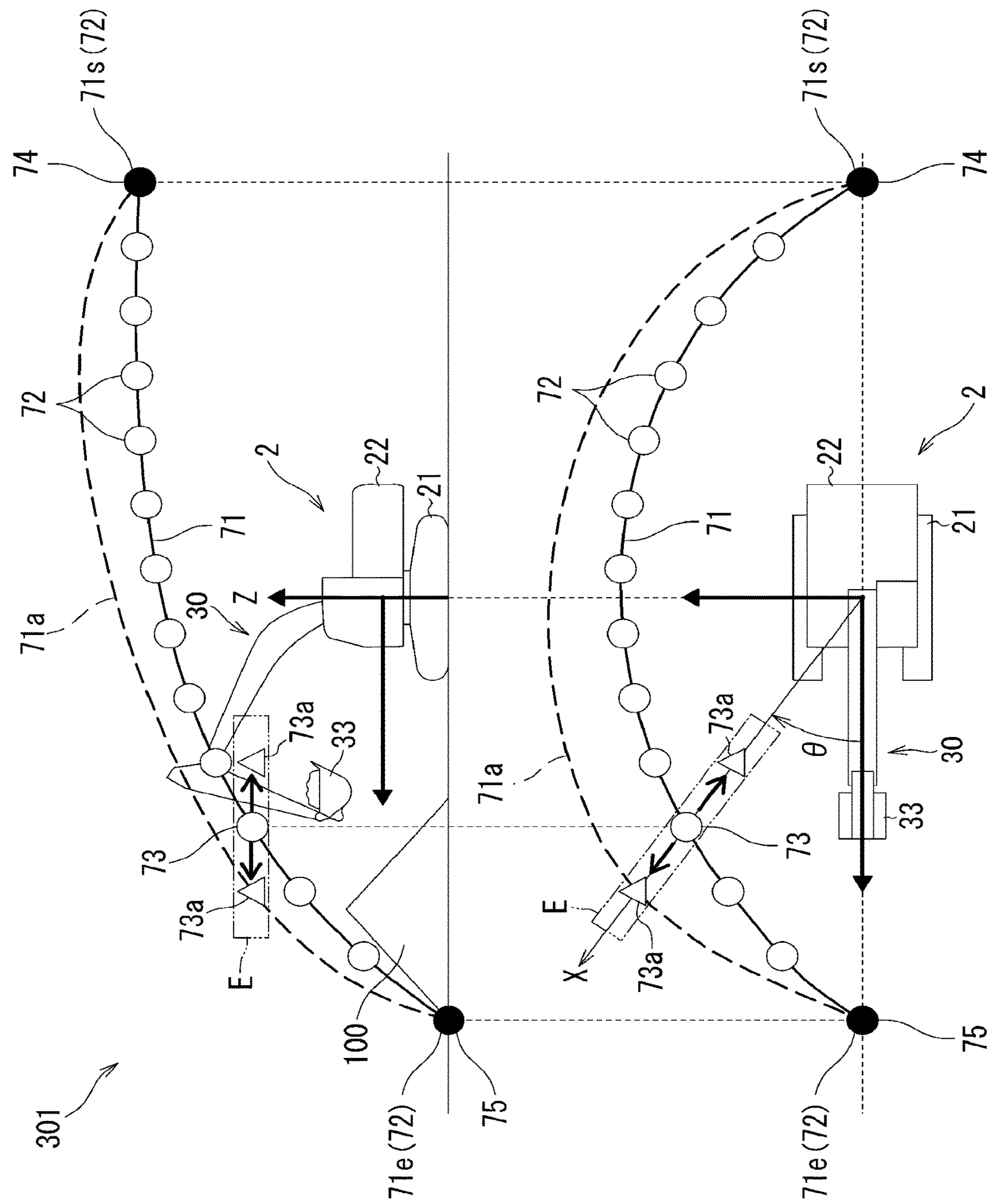
FIG. 12 shows a target path of the leading end of a bucket of Third Embodiment and shows a case where a change object point is moved in the front-rear direction of an upper turning body.
Figure 14:
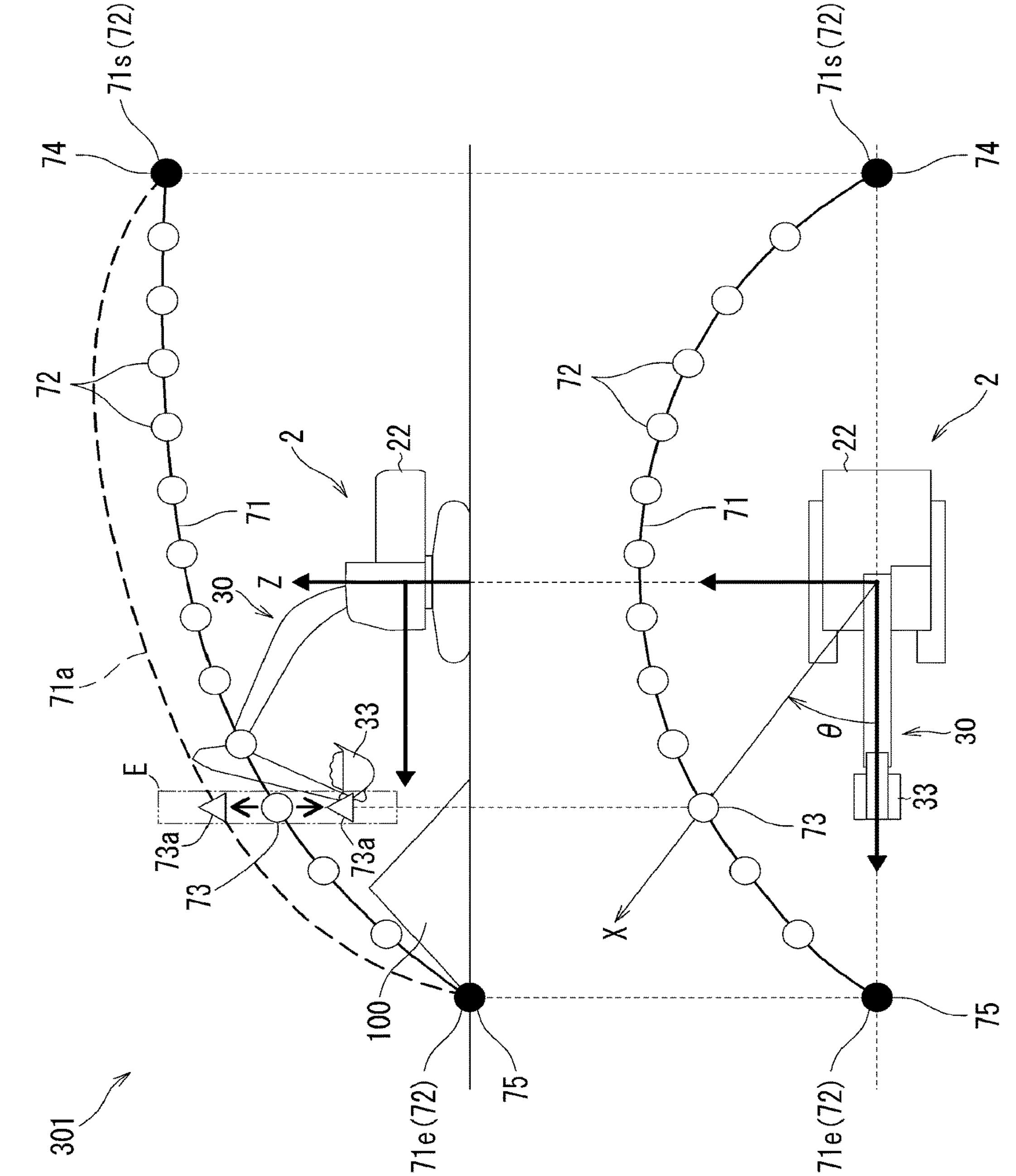
FIG. 14 shows a target path of the leading end of the bucket of Third Embodiment and shows a case where a change object point is moved in the up-down direction of the upper turning body.

Differences between a target path changing system 301 of Third Embodiment and the system of First Embodiment will be described. The main difference is as follows. In First Embodiment, the movable range E shown in FIG. 4 is set based on the posture of the attachment 30 shown in FIG. 1. On the other hand, in the target path changing system 301 of the present embodiment, the movable range E shown in FIG. 12 is set based on a direction related to the upper turning body 22. To be more specific, the movable range E is at least one of a range extending in the front-rear direction (X direction) of the upper turning body 22 or a range extending in the up-down direction (Z direction) of the upper turning body 22 as shown in FIG. 14. The movable range E does not extend in the direction of the turning angle θ. The difference will be detailed below.

The target path changing system 301 includes a dump truck D shown in FIG. 1. The dump truck D includes a truck driver's cabin Da and a cargo bed Db. Onto the cargo bed Db of the dump truck D, an operation target (e.g., soil) held by the working machine 2 is discharged.

(Circuit Configuration of Target Path Changing System)

The controller 11 (target path setting means) (see FIG. 2) sets a target path 71 between a target start point 71*s* and a target end point 71*e* as shown in FIG. 12. The target start point 71*s* is a target point 72 where the attachment 30 starts an operation. The target end point 71*e* is a target point 72 where the attachment 30 ends the operation. In FIG. 12, the target start point 71*s* and the target end point 71*e* are indicated by filled circles (●) whereas the other target points 72 are indicated by open circles (○).

The target path 71 shown in FIG. 12 is that of returning turn. Alternatively, the target path 71 may be that of lifting turn. The returning turn is an action in which the upper turning body 22 turns and the bucket 33 returns to, for example, an excavating position after an operation target retained by the bucket 33 is discharged. The lifting turn is an action in which the upper turning body 22 turns while an operation target (e.g., an operation target scooped at an excavating position) is retained by the bucket 33. To be more specific, for example, when an operation target is soil, the target point 72 farthest from a pile of soil 100 is the target start point 71*s* where the returning turn starts whereas the target point 72 closest to the pile of soil 100 is the target end point 71*e* where the returning turn ends. On the right side of the working machine 2 in FIG. 12, a dump truck D (see FIG. 1) which is not shown in FIG. 12 is located. (The same applies to FIG. 13 and FIG. 14.) In FIG. 12, the target path 71 in a profile of the working machine 2 and the target path 71 in a top view of the working machine 2 are depicted in two dimensions.

The display device 19 displays the target path 71 and the target points 72 in two dimensions. The display state of the display device 19 is shown in FIG. 12.

In the same manner as in First Embodiment, the portable-terminal-side controller 15 (see FIG. 2) allows the operator to select one of the target points 72 as a change object point 73. The portable-terminal-side controller 15 (object point movement unit) then allows the operator to move the change object point 73 in at least one of the front-rear direction of the upper turning body 22 or the up-down direction of the upper turning body 22 (see FIG. 12 and FIG. 14). To be more specific, in the present embodiment, the portable-terminal-side controller 15 (range setting unit) sets the movable range E so that the change object point 73 is movable in at least one of the front-rear direction of the upper turning body 22 or the up-down direction of the upper turning body 22. Specifically, the movable range E may be a range extending in the front-rear direction of the upper turning body 22 from the change object point 73 before the movement. The movable range E may be a range extending in the up-down direction of the upper turning body 22 from the change object point 73 before the movement (see FIG. 14). The portable-terminal-side controller 15 sets the movable range E so that the change object point 73 cannot be moved in directions other than the front-rear direction and the up-down direction of the upper turning body 22 (see FIG. 12 and FIG. 14).

Assume that three-dimensional coordinates of the change object point 73 using the turning center of the upper turning body 22 as the origin are (Xn, Zn, θn). Xn indicates the distance in the X direction from the origin to the change object point 73. The X direction is identical with the front-rear direction of the upper turning body 22 when it is assumed that the leading end of the bucket 33 is provided at the change object point 73 (not illustrated). When viewed from above, the axis of the X direction passes through the origin and the change object point 73. Zn indicates the distance in the Z direction from the bottom surface (e.g., ground) of the lower running body 21 to the change object point 73. The Z direction is identical with the up-down direction of the upper turning body 22. When the working machine 2 is placed on a horizontal plane, the Z direction is identical with the vertical direction. θn indicates an angle in the θ direction between the front surface of the upper turning body 22 and the axis of the X direction.

(Movement in X Direction)

The following will describe a case where the operator moves the change object point 73 in the front-rear direction (X direction) of the upper turning body 22 as shown in FIG. 12. In this example, the movable range E is a range extending in the X direction from the change object point 73 before the movement. The display state of the display device 19 (see FIG. 2) is shown in FIG. 12. In this case, the display device 19 displays a two-dimensional image of the working machine 2 viewed from above, as shown in the lower part of FIG. 12. In this image display, the operator moves the change object point 73 in the X direction by making an input to (e.g., swiping) the touch panel 18 (see FIG. 2). In FIG. 12, the change object point 73 after the movement (after-movement change object point 73*a*) is indicated by an open triangle.

The portable-terminal-side controller 15 (see FIG. 2) may set the movable range E based on the information of the posture of the attachment 30 when it is assumed that the leading end of the bucket 33 is provided at the change object point 73 (see First Embodiment). The size (length) of the movable range E in the X direction may be set based on the information of the posture of the attachment 30 when it is assumed that the leading end of the bucket 33 is positioned at the change object point 73. The portable-terminal-side controller 15 restricts the range of movement of the change object point 73 by the operator within the movable range E.

The portable-terminal-side controller 15 (see FIG. 2) allows the operator to select two of the target points 72 as a change start point 74 and a change end point 75 (in the same manner as in First Embodiment). In the example shown in FIG. 12, the target start point 71*s* is selected as the change start point 74. Furthermore, the target end point 71*e* is selected as the change end point 75.

The controller 11 (target path resetting unit) (see FIG. 2) of the working machine 2 resets the target path 71 within a range between the change start point 74 and the change end point 75 so that the target path 71 passes through the after-movement change object point 73*a* (in the same manner as in First Embodiment). The target path 71*a* having been reset is shown in FIG. 12. FIG. 12 shows the target path 71*a* having been reset, which is in a case where the after-movement change object point 73*a* is the left open triangle in the figure.

The controller 11 (see FIG. 2) resets the target path 71 so that the change start point 74, the change end point 75, and the after-movement change object point 73*a* are connected by a line. This line may be a curved line. To be more specific, the line may be a quadratic curve or a non-quadratic curve such as an arc. The line may be a linear line or a zigzag line.

The display device 19 (see FIG. 2) shows the target path 71 before the resetting and the target path 71*a* after the resetting, in two dimensions. The display device 19 displays the target path 71 before the resetting and the target path 71*a* after the resetting in an overlapped manner. At least one of the target path 71 before the resetting or the target path 71*a* after the resetting may be displayed in three dimensions. For example, when the operator checks the target path 71*a* having been reset, the target path 71*a* having been reset may be displayed in three dimensions.

Figure 13:
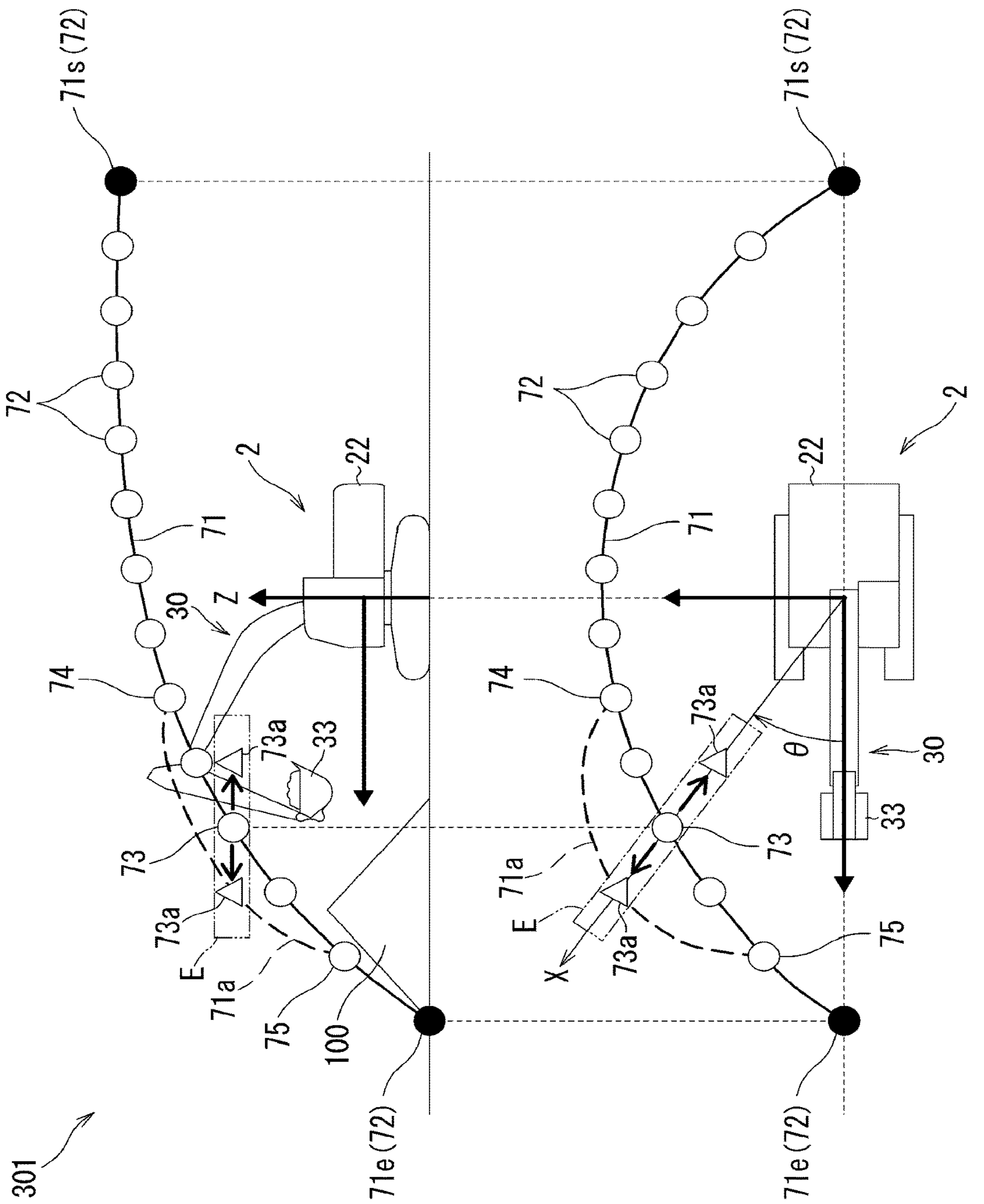
FIG. 13 shows a target path of the leading end of the bucket of Third Embodiment and shows a case where the target path is partially reset.

As shown in FIG. 13 depicting the target path 71 of the leading end of the bucket 33 (see FIG. 1), a target point 72 which is forward of the change object point 73 and different from the target start point 71*s* may be selected as the change start point 74. Likewise, a target point 72 which is rearward of the change object point 73 and different from the target end point 71*e* may be selected as the change end point 75. Also in this case, the target path 71 is reset in a range between the change start point 74 and the change end point 75. FIG. 13 shows the target path 71*a* having been reset, which is in a case where the after-movement change object point 73*a* is the left open triangle in the figure.

(Movement in Z Direction)

The following will describe a case where the change object point 73 is moved in the up-down direction (Z direction) of the upper turning body 22 as shown in FIG. 14 depicting the target path 71 of the leading end of the bucket 33 (see FIG. 1). In this case, as shown in the upper part of FIG. 14, in a two-dimensional image showing a profile of the working machine 2, the operator moves the change object point 73 in the Z direction by making an input to (e.g., swiping) the touch panel 18 (see FIG. 2). In this example, the movable range E is a range extending in the Z direction from the change object point 73 before the movement. In FIG. 14, the after-movement change object point 73*a* is indicated by an open triangle.

In the same manner as in the case where the change object point 73 is moved in the X direction (see FIG. 12), the range of movement of the change object point 73 by the operator is restricted within the movable range E. In addition, the operator selects the change start point 74 and the change end point 75. In FIG. 14, the target start point 71*s* is selected as the change start point 74 and the target end point 71*e* is selected as the change end point 75.

In the same manner as in the case where the change object point 73 is moved in the X direction (see FIG. 12), the controller 11 (see FIG. 2) of the working machine 2 resets the target path 71 within a range between the change start point 74 and the change end point 75 so that the target path 71 passes through the after-movement change object point 73*a*. The target path 71*a* having been reset is shown in FIG. 14. FIG. 14 shows the target path 71*a* having been reset, which is in a case where the after-movement change object point 73*a* is the upper open triangle in the figure. The target path 71*a* having been reset may be a curved line, a linear line, or a zigzag line.

The change object point 73 may be moved in both the front-rear direction (X direction) of the upper turning body 22 and the up-down direction (Z direction) of the upper turning body 22. In the present embodiment, the change object point 73 is immovable in the direction of the turning angle θ. The movable range E is not set to extend in the direction of the turning angle θ. As a modification of the present embodiment, the change object point 73 may be movable in the direction of the turning angle θ.

(Effects)

As shown in FIG. 12, the following effects can be attained by the target path changing system 301 of the present embodiment.

(Effects of Third Aspect)

[Arrangement 3] The range setting unit (e.g., the portable-terminal-side controller 15 shown in FIG. 2) sets the movable range E so that the change object point 73 is movable in at least one of the front-rear direction of the upper turning body 22 or the up-down direction of the upper turning body 22.

In the arrangement 3 described above, the direction in which the change object point 73 is movable is at least one of the front-rear direction of the upper turning body 22 or the up-down direction of the upper turning body 22. The movement of the change object point 73 by the operator is therefore easy to understand as compared to cases where the change object point 73 is movable in directions different from the front-rear direction and the up-down direction of the upper turning body 22 (i.e., movable in any directions).

(Effects of Seventh Aspect)

[Arrangement 7] The target path resetting unit (e.g., the controller 11 shown in FIG. 2) resets the target path 71 so that the change start point 74, the change end point 75, and the after-movement change object point 73*a* are connected by a curved line.

Because the arrangement 7 described above makes it possible to suppress rapid movement of the attachment 30, it is possible to suppress a conveyed object from dropping off (e.g., spilling out) from the attachment 30 and to suppress inefficient movement of the attachment 30. It is therefore possible to improve the working efficiency of the working machine 2.

(Effects of Eighth Aspect)

[Arrangement 8] The above-described curved line (see the arrangement 7 above) is a quadratic curve.

Because the arrangement 8 described above makes it relatively easy to calculate the curved line, it is possible to reduce the calculation load on a device (e.g., the controller 11 shown in FIG. 2) that resets the target path 71.

[Effects of Sixteenth Aspect]

[Arrangement 16] The display device 19 (see FIG. 2) displays the target path 71 before the resetting and the target path 71*a* after the resetting in an overlapped manner.

The arrangement 16 described above allows the operator to check the target path 71 before the resetting and the target path 71*a* after the resetting, which are displayed on the display device 19 (see FIG. 2).

(Effects of Seventeenth Aspect)

[Arrangement 17] The display device 19 (see FIG. 2) shows the target path 71 before the resetting and the target path 71*a* after the resetting, in two dimensions.

Because the target path 71 before the resetting is displayed in two dimensions, the arrangement 17 described above allows the operator to easily understand the moving direction of the change object point 73 as compared to cases where the target path 71 before the resetting is displayed in three dimensions. Furthermore, because the target path 71*a* having been reset is displayed in two dimensions, the operator is allowed to easily understand how the change object point 73 is moved.

(Modifications)

The embodiments above may be variously modified. For example, elements of different embodiments may be combined. For example, the arrangements (e.g., disposition and shape) of each element may be changed. For example, the connection between the elements shown in FIG. 2 may be changed. For example, the order of the steps in the flowchart shown in FIG. 8 may be changed, and one or some of the steps may not be executed. For example, the values and ranges (e.g., "predetermined value" of the distance between an obstacle and a target path 71 (see FIG. 3)) may be manually changed, or may be automatically changed based on a given condition. For example, the number of elements may be changed, and one or some of the elements may not be provided. For example, the fixation or connection between elements may be performed directly or indirectly. For example, those described as different members or different parts may be a single member or part. For example, those described as a single member or part may be provided in a divided manner as plural members or parts.

For example, what are performed by the portable-terminal-side controller 15 shown in FIG. 2 in the embodiments above may be performed by the controller 11 of the working machine 2 or an unillustrated controller (e.g., a server). What are performed by the controller of the working machine 2 in the embodiments above may be performed by the portable-terminal-side controller 15 or an unillustrated controller. To be more specific, for example, while in the embodiments above the portable-terminal-side controller 15 sets the movable range E (see FIG. 3), the setting of the movable range E may be done by the controller 11 of the working machine 2 or an unillustrated server. In the embodiments above, the controller 11 of the working machine 2 sets the target path 71 (see FIG. 3) and resets the target path 71 (see FIG. 5) (see the target path 71*a* having been reset). At least one of these settings may be done by the portable-terminal-side controller 15 or an unillustrated controller (e.g., a server). In the embodiments above, the portable-terminal-side controller 15 of the portable terminal 3 allows the operator to select the change object point 73, the change start point 74, and the change end point 75 shown in FIG. 3, allows the operator to move the change object point 73, and sets the movable range E of the change object point 73. These operations may be done by the controller 11 (see FIG. 2) or an unillustrated controller (e.g., a server).

For example, the dispositions and the number of the elements may be variously changed. To be more specific, for example, while in the embodiments above the display device 19 shown in FIG. 2 is provided on the portable terminal 3, the display may be provided in the cab 23 of the working machine 2 shown in FIG. 1 or may be a monitor connected to, for example, an unillustrated server. Only one display device 19 or plural display devices 19 may be provided. For example, in the embodiments above, the touch panel 18 of the portable terminal 3 shown in FIG. 2 is the device configured to receive inputs from the operator. Alternatively, such a device may be a device provided in the cab 23 of the working machine 2 shown in FIG. 1 or a device (e.g., a keyboard) connected to an unillustrated server.

REFERENCE SIGNS LIST

1, 201, 301 target path changing system
2 working machine
3 portable terminal
4 camera (surrounding state acquisition device)
11 controller (target point setting unit, target path resetting unit, specific interval changing unit)
15 portable-terminal-side controller (object point selection unit, range setting unit, object point movement unit, change start point selection unit, change end point selection unit, first target point movement unit, second target point movement unit, object attachment selection unit, target posture change unit)
19 display device
20 warning device
21 lower running body
22 upper turning body
30 attachment
31 boom
32 arm
33 bucket (leading-end attachment)
71 target path
71*a* target path having been reset
72 target point
73 change object point
73*a* after-movement change object point
74 change start point
75 change end point
E movable range
X front-rear direction of upper turning body 22
Z up-down direction of upper turning body 22

The invention claimed is:

1. A target path changing system for an attachment, which is used for a working machine including a lower running body, an upper turning body attached to an upper part of the lower running body to the rotatable, and the attachment attached to the upper turning body, the system comprising:
a target point setting circuitry which is configured to set target points at specific intervals on a target path of a specific part of the attachment;
a display device which is configured to display the target path and the target points;
an object point selection circuitry which is configured to allow an operator to select one of the existing target points set in the target point setting circuitry as a change object point;
a range setting circuitry which is configured to set a movable range in which the existing change object point set in the object point setting circuitry is movable;
an object point movement circuitry which is configured to allow the operator to move the existing change object point set in the object point setting circuitry within the movable range; and
a target path resetting circuitry which is configured to reset the target path within a range between a change start point that is a target point forward of the change object point and a change end point that is a target point rearward of the change object point so that the target path passes through an after-movement change object point that is the change object point after movement.

2. The target path changing system for the attachment according to claim 1, wherein the target point setting circuitry sets the target points as information associated with posture of the attachment, and based on the information of the posture of the attachment at least one of the change start point, the change end point, or the change object point, the range setting circuitry sets the movable range.

3. The target path changing system for the attachment according to claim 1, wherein the range setting circuitry sets the movable range so that the change object point is movable in at least one of a front-rear direction of the upper turning body or a up-down direction of the upper turning body.

4. The target path changing system for the attachment according to claim 1, further comprising:

a change start point selection circuitry which is configured to allow the operator to select one of the target points forward of the change object point as the change start point; and a change end point selection circuitry which is configured to allow the operator to select one of the target points rearward of the change object point as the change end point.

5. The target path changing system for the attachment according to claim 1, further comprising:

a first target point movement circuitry which is configured to, when the target point is provided between the change start point and the after-movement change object point, move the target point between the change start point and the after-movement change object point to a point on a line connecting the change start point with the after-movement change object point; and a second target point movement circuitry which is configured to, when the target point is provided between the change end point and the after-movement change object point, move the target point between the change end point and the after-movement change object point to a point on a line connecting the change end point with the after-movement change object point.

6. The target path changing system for the attachment according to claim 1, further comprising a specific interval changing circuitry which is configured to allow the operator to change the specific intervals.

7. The target path changing system for the attachment according to claim 1, wherein the target path resetting circuitry is configured to reset the target path so that the change start point, the change end point, and the after-movement change object point are connected by a curved line.

8. The target path changing system for the attachment according to claim 7, wherein the curved line is a quadratic curve.

9. The target path changing system for the attachment according to claim 1, wherein the display device changes a display state of the display device when the object point movement circuitry is trying to move the change object point from the inside of the movable range to the outside of the movable range.

10. The target path changing system for the attachment according to claim 1, wherein the attachment includes:

a boom which is attached to the upper turning body to be rotatable in the up-down direction;

an arm which is attached to the boom to be rotatable in the up-down direction; and a leading-end attachment which is attached to the arm to be rotatable, and the object point movement circuitry includes:

an object attachment selection circuitry which is configured to allow the operator to select at least one of the boom, the arm, and the leading-end attachment as an object attachment; and a target posture change circuitry which is configured to allow the operator to move the change object point by changing a target posture of the object attachment.

11. The target path changing system for the attachment according to claim 1, wherein the display device displays an image in which the specific part of the attachment is positioned at the change object point and the specific part in the image moves in response to an input from the operator, and the object point movement circuitry moves the change object point in accordance with the position of the specific part after movement in the image.

12. The target path changing system for the attachment according to claim 11, wherein the display device changes the display state of the image when the specific part in the image is moved from the inside of the movable range to the outside of the movable range.

13. The target path changing system for the attachment according to claim 1, further comprising a surrounding state acquisition circuitry which is configured to acquire an image indicating a surrounding state of the working machine, the display device displays the surrounding state acquired by the surrounding state acquisition circuitry to be overlapped with the target path and the target points.

14. The target path changing system for the attachment according to claim 13, wherein the surrounding state acquisition circuitry obtains a distance to an object, and the target path changing system further comprises a warning circuitry which is configured to output a warning by sound, vibration, or display when the distance between an obstacle included in the surrounding state and the target path is equal to or less than a predetermined value.

15. The target path changing system for the attachment according to claim 1, wherein the display device displays a video in which the attachment moves while the specific part is kept on the target path.

16. The target path changing system for the attachment according to claim 1, wherein the display device displays the target path before resetting to be overlapped with the target path after the resetting.

17. The target path changing system for the attachment according to claim 1, wherein the display device displays the target path before the resetting and the target path after the resetting in two dimensions.

18. The target path changing system for the attachment according to claim 1, further comprising a portable terminal which is able to mutually communicate with the working machine, the portable terminal including the display device, the object point selection circuitry, and the object point movement circuitry.

* * * * *